United States Patent
Ellis et al.

(10) Patent No.: US 11,796,415 B2
(45) Date of Patent: Oct. 24, 2023

(54) HUMIDITY MONITORING

(71) Applicant: Alarm.com Incorporated, Tysons, VA (US)

(72) Inventors: Keane Jonathan Ellis, Tysons, VA (US); Gustaf Nicolaus Maxwell Lonaeus, Washington, DC (US)

(73) Assignee: Alarm.com Incorporated, Tysons, VA (US)

( * ) Notice: Subject to any disclaimer, the term of this patent is extended or adjusted under 35 U.S.C. 154(b) by 471 days.

(21) Appl. No.: 17/062,771

(22) Filed: Oct. 5, 2020

(65) Prior Publication Data

US 2021/0102861 A1    Apr. 8, 2021

Related U.S. Application Data

(60) Provisional application No. 62/912,109, filed on Oct. 8, 2019.

(51) Int. Cl.
| | |
|---|---|
| G01M 3/16 | (2006.01) |
| G01S 19/01 | (2010.01) |
| G01P 13/00 | (2006.01) |
| H04Q 9/00 | (2006.01) |
| F24H 9/20 | (2022.01) |

(52) U.S. Cl.
CPC ............ *G01M 3/16* (2013.01); *F24H 9/2007* (2013.01); *G01P 13/00* (2013.01); *G01S 19/01* (2013.01); *H04Q 9/00* (2013.01)

(58) Field of Classification Search
CPC ........ G01M 3/16; F24H 9/2007; G01P 13/00; G01S 19/01; H04Q 9/00

USPC .......................................................... 73/40.5 R
See application file for complete search history.

(56) References Cited

U.S. PATENT DOCUMENTS

| | | | | |
|---|---|---|---|---|
| 8,172,154 | B1* | 5/2012 | Figley | F24F 11/63 |
| | | | | 165/223 |
| 8,350,710 | B2 | 1/2013 | Logan et al. | |
| 9,383,289 | B1* | 7/2016 | Meyer | G08B 21/20 |
| 9,986,313 | B2 | 5/2018 | Schwarzkopf et al. | |
| 10,579,028 | B1 | 3/2020 | Jacob | |
| 2018/0087793 | A1 | 3/2018 | Okita et al. | |
| 2019/0025150 | A1* | 1/2019 | Picardi | G01F 15/005 |
| 2019/0171178 | A1 | 6/2019 | Burke et al. | |

* cited by examiner

*Primary Examiner* — Alesa Allgood
*Assistant Examiner* — Byung Ro Lee
(74) *Attorney, Agent, or Firm* — Fish & Richardson P.C.

(57) ABSTRACT

Methods, systems, and apparatus for monitoring humidity at a property are disclosed. A monitoring system performs operations including: obtaining, from multiple humidity sensors within the property, humidity data; obtaining occupancy data that indicates whether people are within the property; determining, based on the humidity data and the occupancy data, that humidity in a first area of the property changed more relative to a change in humidity in a second area of the property during a time period when no person was present in the first area and no person was present in the second area; and in response to determining that humidity in the first area changed more relative to a change in humidity in a second area of the property during the time period, providing an indication of a water leak in the first area of the property to a user.

20 Claims, 5 Drawing Sheets

HUMIDITY MONITORING

CROSS-REFERENCE TO RELATED APPLICATION

This application claims the benefit of U.S. Application No. 62/912,109, filed Oct. 8, 2019, which is incorporated by reference in its entirety.

TECHNICAL FIELD

This disclosure application relates generally to property monitoring systems with humidity sensors.

BACKGROUND

This disclosure application relates generally to property monitoring systems with humidity sensors. Many properties are equipped with monitoring systems that include sensors and connected system components. Some monitoring systems include humidity sensors that may measure humidity levels of a property. Humidity sensors and other monitoring devices are often dispersed at various locations at a property such as a home or commercial business.

SUMMARY

Monitoring systems can measure humidity levels of various areas of a property using humidity sensors. Humidity sensors measure the water vapor content in air. Low humidity levels may cause damage to building materials that may crack when the air is too dry. High humidity levels may cause damage to building materials due to promoting the growth and spread of mold and bacteria. High humidity levels can be indicative of water leaks within a property and/or of air leaks in a property's building envelope.

Monitoring systems can monitor humidity levels of a property and generate notifications for anomalies detected at the property. For example, monitoring systems can send notifications to users, such as property residents, indicating that a humidity is higher than expected, rising faster than expected, or both.

Monitoring systems can perform humidity monitoring to detect water leaks at a property. For example, monitoring systems can compare humidity levels to baseline humidity data to identify anomalies that may be due to water leaks. Monitoring systems can compare a humidity of a first humidity sensor to a humidity of a second humidity sensor to determine a suspected location of a water leak. A first humidity sensor measuring a higher humidity than a second humidity sensor may be located nearer to a water leak than the second humidity sensor.

Monitoring systems can perform humidity monitoring to detect air leaks in a building envelope of a property. For example, monitoring systems can compare a rate of change of humidity measured by a first humidity sensor to a rate of change of humidity measured by a second humidity sensor. A first humidity sensor with a greater rate of change than a second humidity sensor may be located nearer to an air leak in the building envelope than the second humidity sensor.

Monitoring systems may perform humidity monitoring when a property, or an area of a property, is unoccupied by people. Monitoring systems can determine that a property is unoccupied by people based on sensor data, e.g., motion sensor data, from various areas of the property. Performing humidity monitoring when the property is unoccupied by people can improve the accuracy of the humidity measurements.

Humidity monitoring may detect a water leak earlier than other methods of water leak detection. For example, a small water leak behind a wall of a property may go unnoticed until the leak causes damage to the property. Using humidity monitoring, the monitoring system can alert a resident of the property that there is a suspected water leak, and can identify a likely location of the leak. The resident can then investigate the location and repair the water leak before any damage to the property occurs.

Similarly, humidity monitoring may detect an air leak earlier than other methods of air leak detection. For example, a small air leak around a door frame may go unnoticed, resulting in inefficient heating and cooling of a property. Using humidity monitoring, the monitoring system can alert a resident of the property that there is a suspected air leak, and can identify a likely location of the leak. The resident can then investigate the location and repair the air leak, improving the energy efficiency of the property.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
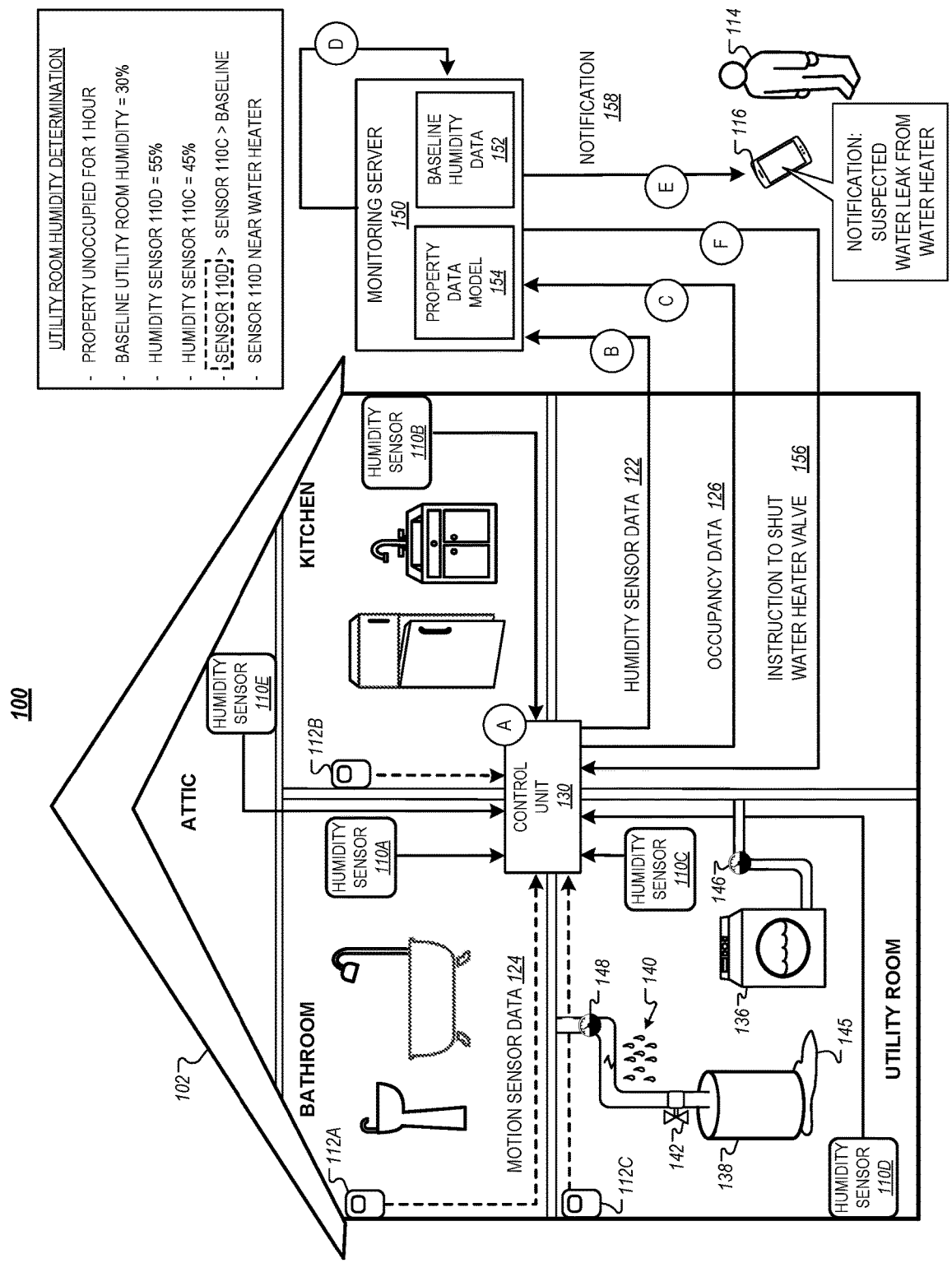
FIG. 1 shows a block diagram of an example monitoring system for monitoring humidity levels at a property to detect water leaks.

FIG. 1 shows a block diagram of an example monitoring system 100 for monitoring humidity levels at a property 102 to detect water leaks. The property 102 may be a home, another residence, a place of business, a public space, or another facility that is monitored by the monitoring system 100. The monitoring system 100 includes sensors, such as video cameras, microphones, and temperature sensors, distributed about the property 102 to monitor conditions at the property 102. For example, sensors can be located in an attic, a bathroom, a kitchen, and a utility room of the property 102. The sensors collect data throughout the property and send the data to a control unit 130 of the monitoring system 100. The control unit 130 may communicate with a remote monitoring server 150.

The monitoring system 100 includes humidity sensors 110A to 110E, collectively referred to as humidity sensors 110. Humidity sensor 110A is located in the bathroom, humidity sensor 110B is located in the kitchen, humidity sensors 110C and 110D are located in the utility room, and humidity sensor 110E is located in the attic.

In some examples, the control unit 130 and/or the monitoring server 150 may include a property data model 154. The property data model 154 may include locations of rooms of the property 102, and locations of major appliances and fixtures, such as dishwashers, bathtubs, and refrigerators. The property data model 154 may also include the locations of each humidity sensor 110 in relation to the rooms and appliances. For example, the property data model 154 can include that the humidity sensors 110C and 110D are both located in the utility room, and that the humidity sensor 110C is near the laundry machine 136, while the humidity sensor 110D is near the water heater 138.

The humidity sensors 110 measure the level of moisture in the air. The humidity sensors 110 can be, for example, capacitive, resistive, and/or thermal conductivity humidity sensors. The humidity sensors 110 can measure humidity in units of relative humidity, typically expressed as a percentage. A higher percentage indicates a higher ratio of water vapor to dry air in the air mixture, and therefore a higher humidity. A relative humidity of 100% indicates that the air is saturated and is at its dewpoint. A relative humidity of 0% indicates that the air is devoid of water vapor. In this specification, "humidity" generally refers to relative humidity expressed as a percentage.

A typical property has a humidity that ranges from approximately 30% to 50%. Humidity levels that are very low may cause damage to wood and other building materials that may crack when the air is too dry. Humidity levels that are very high can promote growth and spread of mold and bacteria. High humidity levels can also be indicative of water leaks within a property and/or of air leaks in a property's building envelope.

In some examples, one or more of the humidity sensors 110 may be binary sensors. A binary sensor can monitor for humidity levels within a certain range, e.g., 30% to 50%. When conditions pass outside of the range, the humidity sensors 110 can send an alert signal to the control unit 130. When conditions return to the range, the humidity sensors 110 can clear the signal.

In some examples, one or more of the humidity sensors 110 may be rope-based sensors. A rope-based sensor can monitor for high humidity and wetness along the length of a sensing rope. If any part of the rope becomes wet, the humidity sensors 110 can send an alert signal to the control unit 130. When the rope dries, the humidity sensors 110 can clear the signal.

Various factors can affect the indoor humidity of a property. For example, humidity levels may rise at a property when people are at the property. For example, activities such as taking a shower, boiling water, and mopping a floor can cause humidity to rise. Human breath and perspiration can also cause slight rises in humidity.

Outdoor humidity can also affect humidity levels within a property. Air from outside of the property may enter through doors, windows, and any air leaks in the building envelope of the property. Thus, indoor humidity generally rises when outdoor humidity rises, and lowers when outdoor humidity lowers.

Indoor humidity can be affected by an air conditioning system. An air conditioning system removes heat from the air of a property through the use of refrigerant flowing through an evaporator coil. When the air flows over the evaporator coil, water vapor in the air condenses, reducing the humidity of the property.

Humidity sensors 110 can be used to detect for water leaks and other unwanted water sources in a property. For example, a pipe water leak or flood can cause the humidity of one or more areas of the property to increase. In some examples, sensitive humidity sensors 110 can detect for small water leaks that otherwise would go unnoticed. For example, a sensitive humidity sensor may be able to detect a rise in humidity due to a slowly dripping pipe under a sink.

Because the presence of people can affect humidity, humidity monitoring is more accurate when the property 102, or certain areas of the property 102, are unoccupied. For example, the bathroom may have a leaky pipe under a sink that causes humidity to increase 1% per hour. When the bathroom is occupied, the humidity of the bathroom measured by humidity sensor 110A may increase 10% or more due to activities such as showering, bathing, and/or running a faucet. Thus, when the bathroom is occupied, the monitoring system 100 may not be able to detect the 1% humidity rise due to the leaky pipe.

Conversely, when the bathroom is unoccupied, the humidity of the bathroom is expected to decrease or remain approximately steady. If the humidity rises 1% per hour in an unoccupied bathroom, the monitoring system 100 can determine that there may be a water leak in the bathroom. Thus, the monitoring system 100 may wait to perform humidity monitoring when the property 102, or certain areas of the property 102, are unoccupied.

In some examples, the monitoring system 100 may perform humidity monitoring after the property 102 is unoccupied for a designated period of time, e.g. one or two hours. The monitoring system 100 may determine when the property 102 is unoccupied, e.g., based a pre-programmed or adjustable schedule or sensor data.

For example, a resident 114 may depart from the property 102 each weekday morning at 7:00 am and return at 5:00 pm. In some examples, the resident 114 may input his or her schedule into the monitoring system 100, e.g., through the control unit 130. In some examples, the monitoring system 100 may determine the resident's schedule based on analyzing monitoring system 100 data, e.g., motion sensor data, video camera data, monitoring system 100 arming states, and door lock data, over a period of time. In another example, the monitoring system 100 may not determine a schedule but simply determine whether anyone is in the property 102 or not from analyzing the monitoring system 100 data.

The monitoring system 100 can determine to start humidity monitoring each weekday morning after the resident 114 departs, and to end humidity monitoring each weekday afternoon before the resident 114 returns. By performing humidity monitoring while the property 102 is unoccupied, the monitoring system 100 can improve the accuracy of the humidity analysis.

In some examples, the monitoring system 100 may be programmed to perform humidity monitoring only when the entire property 102 is unoccupied. In some examples, the monitoring system 100 may be programmed to perform humidity monitoring when individual rooms of the property 102 are unoccupied. For example, the resident 114 may be concerned about water leaks and flooding in the utility room. Thus, the resident 114 may program the monitoring system 100 to perform humidity monitoring in the utility room whenever the utility room is unoccupied. The resident 114 may be less concerned about water leaks and flooding in the kitchen. Thus, the resident 114 may program the monitoring system 100 to perform humidity monitoring in the kitchen only when the entire property 102 is unoccupied.

Humidity sensors 110 can be placed in various locations at a property. For example, a user such as a resident or installer may install one humidity sensor on each level of a property, one humidity sensor in each bathroom of a property, and/or one humidity sensor near each large water appliance, e.g., a water heater, a laundry machine, and a dishwasher.

In general, humidity sensors 110 that are located closer to the source of a water leak will likely measure a higher humidity compared to humidity sensors 110 that are located farther from the source of the water leak. If a water leak occurs in the same room as a humidity sensor, the humidity sensor may detect a measurable increase in humidity, e.g., of 5% or 10%. If a water leak occurs on the same floor as a humidity sensor, but in a different room, the humidity sensor may detect a smaller increase in humidity, e.g., of 1% to 5%. For example, if a water leak occurs in the bathroom of the property 102, the humidity sensor 110A, located in the bathroom, will likely detect a greater humidity increase than the humidity sensor 110B, located in the kitchen.

If a large amount of water is introduced, e.g., in the event of flooding, all humidity sensors 110 may measure a humidity increase, with the humidity sensors 110 closest to the water source measuring the greatest humidity increase. For example, if the utility room of the property 102 floods, all humidity sensors 110 will likely measure a humidity increase, with the humidity sensors 110C, 110D measuring the greatest humidity increase.

The monitoring system 100 includes motion sensors 112A to 112C, collectively referred to as motion sensors 112. The motion sensors 112 can be, for example, passive infrared (PIR) sensors. PIR sensors can detect moving heat signatures, e.g., from people moving throughout the property. Motion sensor 112A is located in the bathroom, motion sensor 112B is located in the kitchen, and motion sensor 112C is located in the utility room.

The motion sensors 112 can send motion sensor data 124 to the control unit 130. The control unit 130 can determine occupancy data 126 based on the motion sensor data 124. The occupancy data 126 can include a determination of whether or not people are present in individual rooms of the property 102, or the property 102 as a whole. For example, based on motion sensor data 124 that indicates no movement in the kitchen, the control unit 130 may determine occupancy data 126 including that no people are present in the kitchen.

The control unit 130 receives sensor data from the various sensors at the property 102, including the humidity sensors 110 and the motion sensors 112. The control unit 130 can send the sensor data to a remote monitoring server 150. In some examples, sensors can send the sensor data directly to the remote monitoring server 150. In some examples, the sensors communicate electronically with the control unit 130 through a network.

The network may be any communication infrastructure that supports the electronic exchange of data between the control unit 130 and the humidity sensors 110. The network may include a local area network (LAN), a wide area network (WAN), the Internet, or other network topology. The network may be any one or combination of wireless or wired networks and may include any one or more of Ethernet, cellular telephony, Bluetooth, Wi-Fi, Z-Wave, ZigBee, Bluetooth, and Bluetooth LE technologies. In some implementations, the network may include optical data links. To support communications through the network, one or more devices of the monitoring system 100 may include communications modules, such as a modem, transceiver, modulator, or other hardware or software configured to enable the device to communicate electronic data through the network.

The control unit 130 may be a computer system or other electronic device configured to communicate with components of the monitoring system 100 to cause various functions to be performed for the monitoring system 100. The control unit 130 may include a processor, a chipset, a memory system, or other computing hardware. In some cases, the control unit 130 may include application-specific hardware, such as a field-programmable gate array (FPGA), an application-specific integrated circuit (ASIC), or other embedded or dedicated hardware. The control unit 130 may include software, which configures the unit to perform the functions described in this disclosure. In some implementations, a resident 114 of the property 102, or another user, communicates with the control unit 130 through a physical connection (e.g., touch screen, keypad, etc.) and/or network connection. In some implementations, the resident 114 or other user communicates with the control unit 130 through a software ("smart home") application installed on a mobile device 116.

The monitoring server 150 can be, for example, one or more computer systems, server systems, or other computing devices. In some examples, the monitoring server 150 is a cloud computing platform. In some examples, the monitoring server 150 communicates with various components of the monitoring system 100 through the control unit 130. In some examples, the monitoring server 150 may communicate directly with various components of the monitoring system 100, e.g., the humidity sensors 110.

The control unit 130 communicates with the monitoring server 150 via a long-range data link. The long-range data link can include any combination of wired and wireless data networks. For example, the control unit 130 may exchange information with the monitoring server 150 through a wide-area-network (WAN), a cellular telephony network, a cable connection, a digital subscriber line (DSL), a satellite connection, or other electronic means for data transmission. The control unit 130 and the monitoring server 150 may exchange information using any one or more of various communication synchronous or asynchronous protocols, including the 802.11 family of protocols, GSM, 3G, 4G, 5G, LTE, CDMA-based data exchange or other techniques.

The monitoring system 100 can include one or more controls that enable automation of various property actions, such as opening/shutting valves, locking/unlocking doors, adjusting lighting conditions, or adjusting the temperature at the property. The control unit 130 can communicate with one or more home automation controls of the property 102 to control the operation of home automation devices at the property. For example, control unit 130 can manage operation of one or more of a thermostat, a humidifier, door locks, interior or exterior lights, water valves, as well as operation of the humidity sensors 110 and motion sensors 112.

In some implementations, the control unit 130 and/or the monitoring server 150 communicates with the mobile device 116, possibly through the network. The mobile device 116 may be, for example, a portable personal computing device, such as a cellphone, a smartphone, a tablet, a laptop, or other electronic device. In some examples, the mobile device 116 is an electronic home assistant or a smart speaker.

In some implementations, the monitoring system 100 may undergo a calibration phase upon installation at the property 102. The calibration phase may include installing the humidity sensors 110 throughout the property 102 and monitoring humidity levels over a period of time. The calibration phase can be used to establish baseline humidity data 152 for normal humidity levels when there are no water leaks at the property 102. During the calibration phase, the installer and/or resident may shut off the water source to the property 102 and/or depressurize the plumbing systems of the property 102 to ensure there are no water leaks. During the calibration phase, the property 102 may be unoccupied to ensure that the humidity levels are not affected by human activity at the property 102.

The monitoring system 100 can generate baseline humidity data 152 based on the results of the calibration phase. The baseline humidity data 152 can include typical humidity values and/or ranges for various areas of the property. For example, the baseline humidity data 152 can include a typical humidity value of 30% for the utility room.

Following the calibration phase, the monitoring system 100 can update the baseline humidity data 152 over time. For example, humidity levels may depend on various environmental factors, e.g., time of day, indoor temperature, outdoor temperature, and outdoor humidity. The monitoring system 100 can update the baseline humidity data 152 to include baseline humidity levels for specific environmental conditions. For example, the baseline humidity data 152 can include a typical humidity value of 45% on warm, clear days, and of 35% on cold, rainy days. The monitoring system 100 can use the baseline humidity data 152 as reference to determine when there are anomalies such as water leaks and floods at the property 102.

FIG. 1 includes stages (A) through (F), which represent a flow of data. In stage (A) of FIG. 1, the control unit 130 receives humidity sensor data 122 from the humidity sensors 110, and motion sensor data 124 from the motion sensors 112.

The humidity sensor data 122 includes humidity levels measured by the humidity sensors 110. For example, the humidity sensor data 122 may include a humidity of 32% measured by humidity sensor 110A, 32% measured by humidity sensor 110B, and 30% measured by humidity sensor 110E. The humidity sensor data 122 may include a humidity of 45% measured by humidity sensor 110C and 55% measured by humidity sensor 110D.

The motion sensor data 124 includes detections of motion measured by the motion sensors 112. For example, the motion sensor data 124 may indicate no motion detected by the motion sensor 112A in the bathroom, by the motion sensor 112B in the kitchen, nor by the motion sensor 112C in the utility room.

The control unit 130 receives the humidity sensor data 122, including the humidity levels measured by the humidity sensors 110. The control unit 130 may analyze the humidity sensor data 122, for example, by determining a rate of change of humidity levels measured by each of the humidity sensors 110. For example, for the humidity sensor 110A, the control unit 130 may compare the current humidity of 32% to a prior hour humidity of 30% to determine a rate of change of +2% per hour.

The control unit 130 receives the motion sensor data 124. The control unit 130 may analyze the motion sensor data 124, for example, to determine the occupancy data 126. The occupancy data 126 can include the occupancy of individual rooms of the property 102 and/or the occupancy of the property 102. For example, the occupancy data 126 can indicate that, based on motion sensor data 124, no people are present in the bathroom, the kitchen, or the utility room. The occupancy data 126 may also indicate that no people are present in any area of the property 102, and thus that the property 102 is unoccupied.

In some examples, the control unit 130 can determine the occupancy data 126 of the property 102 using additional sensors at the property 102. The control unit 130 may collect and analyze, for example, video camera data, audio data, and monitoring system 100 arming states to determine the occupancy of the property 102. For example, when the resident 114 departs from the property 102, video camera data may include images of the resident 114 departing, audio data may include no observable sounds detected throughout the property, and the monitoring system 100 arming state may be set to "armed, away."

In some examples, the control unit 130 can determine occupancy data 126 based on geolocation. For example, the control unit 130 may receive a geographic location, e.g., global positioning system (GPS) coordinates, of the mobile device 116 associated with the resident 114. The control unit 130 may determine that the property 102 is unoccupied if the GPS location of the mobile device 116 is away from the property 102. The control unit 130 may determine that the property 102 is occupied if the GPS location of the mobile device 116 is at or near the property 102. In some examples, the control unit 130 can determine the occupancy data 126 based on motion sensor data 124, and can confirm the occupancy data 126 based on other sensor data and/or geolocation.

In stage (B) of FIG. 1, the control unit 130 sends humidity sensor data 122 to the monitoring server 150 for analysis and determination of an action. The humidity sensor data 122 can include the humidity levels measured by the humidity sensors 110 and/or the rate of change of the humidity levels. The humidity sensor data 122 includes the humidity of 45% measured by humidity sensor 110C and 55% measured by humidity sensor 110D. The humidity sensor data 122 may also include a rate of change, e.g., of +3% per hour for the humidity sensor 110C and +5% per hour for the humidity sensor 110D. In some cases, the humidity sensor data 122 is processed by the control unit 130 before being sent to the monitoring server 150. For example, the humidity sensor data 122 may be filtered, down-sampled, annotated, or transformed.

In stage (C) of FIG. 1, the control unit 130 sends occupancy data 126 to the monitoring server 150 for analysis and determination of an action. The occupancy data 126 can include the motion sensor data 124 measured by the motion sensors 112 and/or the assessed occupancy of various areas of the property. The occupancy data 126 indicates that the property 102 is unoccupied. In some cases, the occupancy data 126 is processed by the control unit 130 before being sent to the monitoring server 150. For example, the occupancy data 126 may be filtered, down-sampled, annotated, or transformed.

In stage (D) of FIG. 1, the monitoring server 150 analyzes the humidity sensor data 122 and the occupancy data 126. For example, the monitoring server 150 can analyze the occupancy data 126 to determine a length of time that the property 102 has been unoccupied. The monitoring server 150 may determine that the property 102 has been unoccupied for one hour.

The monitoring server 150 can analyze the humidity sensor data 122 to identify any anomalies in humidity at the property 102. The monitoring server 150 compares the humidity levels to the baseline humidity data 152. In some examples, the monitoring server 150 may compare the humidity levels to the baseline humidity data 152 for comparable environmental conditions. For example, on a cold, rainy day, the monitoring server 150 may compare the humidity levels to the baseline humidity data 152 for previous cold, rainy days.

The monitoring server 150 compares the utility room humidity to the baseline humidity data 152 of 30% for the utility room. The humidity of the utility room is 45%, as measured by humidity sensor 110C, and 55%, as measured by humidity sensor 110D. The monitoring server 150 can determine that the humidity measured by humidity sensor 110C is higher than the baseline humidity data 152, and that the humidity measured by humidity sensor 110D is higher humidity than measured by humidity sensor 110C.

The monitoring server 150 may also compare the rates of change of the humidity sensors 110. For example, the monitoring server 150 may compare the +5% per hour rate of change of humidity sensor 110D to the +3% per hour rate of change of humidity sensor 110C, to determine that humidity sensor 110D is rising faster than the humidity sensor 110C.

Based on analyzing the humidity levels measured by the humidity sensors 110 and the rates of change of the humidity levels, the monitoring server 150 may determine that there is an anomaly in the utility room humidity. The humidity sensors 110C and 110D both measure humidity higher than the baseline humidity data 152, and rising. The humidity sensor 110D, located near the water heater 138, measures a higher humidity compared to the humidity sensor 110C, located near the laundry machine 136. The humidity measured by the humidity sensor 110D is also rising faster than the humidity sensor 110C. Since the property 102 has been unoccupied for one hour, the monitoring server 150 determines that the anomaly is not likely due to any human activity.

Based on the property data model 154, including locations of the humidity sensors 110 in relation to locations of appliances, the monitoring server 150 can determine that the humidity is higher near the water heater 138 than near the laundry machine 136. The monitoring server 150 may therefore determine that the humidity anomaly is likely due to a water leak from the water heater 138.

In some examples, the monitoring server 150 may analyze additional data that may be related to humidity levels and potential causes of humidity anomalies. For example, the monitoring server 150 may collect water flow data. Water flow meters, e.g., the water flow meters 146, 148 located in the utility room, may measure water flow rates through piping at the property 102. The water flow meters 146, 148 may send water flow data to the monitoring server 150, e.g., through the control unit 130. The water flow meters 146, 148 can send water flow data to the monitoring server 150 over a period of time during operation of the laundry machine 136 and the water heater 138, respectively. The monitoring server 150 may correlate the water flow data with the humidity sensor data 122 to determine a cause of a rise in humidity.

For example, the humidity sensor 110D measures a humidity of 55%, which is greater than the baseline 30% and indicates a possible water leak from the water heater 138. The monitoring server 150 can collect and analyze water flow data from the water flow meter 148 while the water heater 138 is operating, and from the water flow meter 146 while the laundry machine 136 is operating. The monitoring server 150 can analyze the water flow data from the water flow meter 146 and determine that the water flow data is similar to past water flow data from the water flow meter 146. The monitoring server 150 can analyze the water flow data from the water flow meter 148 and determine that the water flow data is lower compared to past water flow data from the water flow meter 148. The monitoring server 150 can correlate the water flow data from the water flow meter 148 with the humidity sensor data 122 from the humidity sensor 110D to confirm that there is likely a water leak from the water heater 138.

In some examples, the monitoring server 150 can analyze the water flow data and the humidity sensor data 122 to determine if there is a correlation between water flowing and humidity rising. The humidity sensor 110C may detect a rising humidity when water flows through the water flow meter 148, e.g., when the water heater 138 is operating, and a lowering humidity when water stops flowing through the water flow meter 148, e.g., when the water heater 138 is not operating. Based on analyzing water flow data and the humidity sensor data 122, the monitoring server 150 may determine and/or confirm that there is a suspected water leak from the water heater 138.

The monitoring server 150 may also collect and analyze additional sensor data, e.g., video camera data and/or audio data, that may be related to potential causes of humidity anomalies. For example, the monitoring server 150 may collect video camera data from a video camera in the utility room and/or audio data from a microphone in the utility room. The video camera data may include images of water 140 leaking from a pipe and/or images of a puddle 145 near the water heater 138. The audio data may include the sound of water flowing or dripping. The monitoring server 150 can correlate the additional sensor data with the humidity sensor data 122 and/or water flow data to confirm that there is likely a water leak from the water heater 138.

Based on analyzing the humidity sensor data 122 and occupancy data 126, the monitoring server 150 may take one or more actions. The monitoring server 150 may take one or more actions, e.g., based on pre-programmed rules, thresholds, and settings. For example, a rule may state that, while the property 102 is unoccupied, the monitoring server 150 sends a notification 158 to the resident 114 for any humidity sensor data 122 greater than 10% above the baseline humidity data 152. In another example, a rule may state that for any humidity sensor data 122 greater than 20% above the baseline humidity data 152, the monitoring server 150 sends an instruction to the control unit 130 to shut water valves connected to any suspected leaking appliance or fixture. The rules may be programmed, for example, by the resident 114 or by an installer or operator of the monitoring system 100.

In stage (E) of FIG. 1, the monitoring server 150 takes an action of sending a notification 158 to one or more users, e.g., the resident 114. The one or more users can also include, for example, a landlord, tenant, property manager, or property maintenance manager of the property 102. The monitoring server 150 can send the notification 158 to the resident 114 regarding the suspected water leak from the water heater 138. The monitoring server 150 can send the notification 158 to the resident 114 via the mobile device 116 and/or the control unit 130. The notification 158 may include the humidity sensor data 122 for the utility room, the location of suspected water leak, video data of the utility room, or any of these.

In stage (F) of FIG. 1, the monitoring server 150 sends an instruction 156 to the control unit 130 to shut a water heater valve 142. The monitoring server 150 sends the instruction 156 to shut the water heater valve 142 based on the suspected water leak from the water heater 138, and in accordance with pre-programmed rules and settings. The control unit 130 receives the instruction to shut the water heater valve 142 and sends a command using automation controls to shut the water heater valve 142. Shutting the water heater valve 142 stops the flow of water from the water heater 138 and slows or stops the water leak.

Though described above as being performed by a particular component of system 100 (e.g., the control unit 130 or the monitoring server 150), any of the various control, processing, and analysis operations can be performed by either the control unit 130, the monitoring server 150, or another computer system of the monitoring system 100. For example, the control unit 130, the monitoring server 150, or another computer system can analyze the data from the sensors to determine system actions. Similarly, the control unit 130, the monitoring server 150, or another computer system can control the various sensors, and/or property automation controls to collect data or control device operation.

Figure 2:
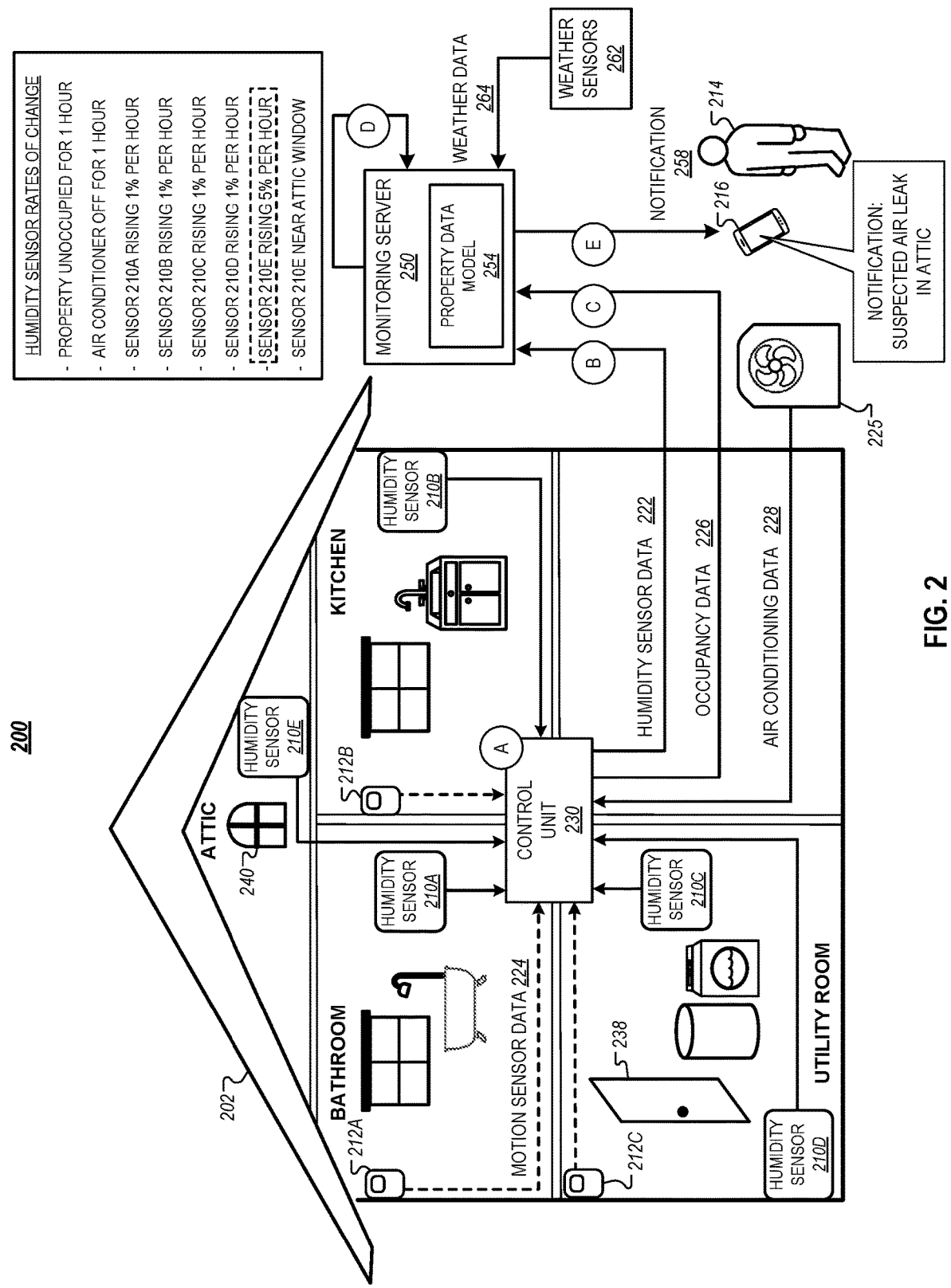
FIG. 2 shows a block diagram of an example monitoring system for monitoring humidity levels at a property to detect air leaks in a building envelope.

FIG. 2 shows a block diagram of an example monitoring system 200 for monitoring humidity levels at a property 202 to detect air leaks in a building envelope. The monitoring system 200 includes components that are similar in design and operation to components of the monitoring system 100.

A building envelope is a physical separator between the inside environment of a building and the outside environment. Elements of a building envelope can include a foundation, walls, doors, windows, and a roof. The building envelope is designed to protect the inside environment from outside elements, e.g., humidity, precipitation, wind, and temperature. The building envelope includes holes such as windows and doors. Outdoor elements may enter the building envelope through holes, e.g., when the windows and doors are opened. Outdoor elements may also enter the building envelope if there are air leaks in the building envelope. Air leaks are likely to exist at or near holes, e.g., if there are openings around door or window frames.

Air leaks may develop in a building envelope over time, e.g., due to gradual degradation of door seals, window seals, roof shingles, and/or insulation. Air leaks can cause an increase in humidity of a property when the outdoor humidity is greater than the indoor humidity. Air leaks can also reduce the efficiency of heating and cooling systems of a property.

The monitoring system 200 includes a system for monitoring an attic, bathroom, kitchen and utility room. The monitoring system 200 includes humidity sensors 210A to 210E, referred to as humidity sensors 210. Humidity sensor 210A is located in the bathroom, humidity sensor 210B is located in the kitchen, humidity sensors 210C and 210D are located in the utility room, and humidity sensor 210E is located in the attic.

In some examples, the control unit 230 and/or the monitoring server 250 may include a property data model 254. The property data model 254 may include locations of rooms of the property 202, and locations of holes in the building envelope of the property such as windows and doors. The property data model 254 may also include the locations of each humidity sensor 210 in relation to the windows and doors. For example, the property data model 254 can include that the humidity sensors 210C and 210D are both located in the utility room, and that the humidity sensor 210C is located further from the door 238 compared to the humidity sensor 210D.

The monitoring system 200 includes motion sensors 212A to 212C, referred to as motion sensors 212. Motion sensor 212A is located in the bathroom, motion sensor 212B is located in the kitchen, and motion sensor 212C is located in the utility room.

The monitoring system 200 includes an air conditioner 225. When the outdoor temperature is higher than the indoor temperature, the air conditioner 225 operates in cycles based on a thermostat setting controlled by the control unit 230.

For example, the thermostat may control the air conditioner 225 to maintain a specific temperature, e.g., 70 degrees, inside the property 202 while a resident 214 is at the property 202. As the air conditioner 225 operates, the indoor temperature of the property 202 lowers. When the indoor temperature reaches 70 degrees, the air conditioner 225 stops. When the indoor temperature rises above 70 degrees, the air conditioner 225 starts to operate again.

While the air conditioner 225 operates, the air conditioner 225 removes water vapor from the air, reducing the indoor humidity of the property 202. When the air conditioner 225 stops, the humidity changes over time based on the outdoor humidity. For example, with the air conditioner 225 stopped, and the outdoor humidity greater than the indoor humidity, the indoor humidity rises toward the outdoor humidity. Eventually the indoor humidity will rise to match the outdoor humidity, due to air leaks in the building envelope.

Based on programmed settings, the thermostat may control the air conditioner 225 to maintain a higher temperature, e.g., 75 degrees, inside the property 202 while the resident 214 is not at the property 202. Thus, when the resident 214 departs from the property 202, the air conditioner 225 may run less frequently, and for shorter amounts of time, compared to when the resident 214 is at the property 202.

The air conditioner 225 sends air conditioning data 228 to the control unit 230. The air conditioning data 228 can include the start and stop times of the air conditioner 225. For example, the air conditioner 225 can send a "start" signal to the control unit 230 when the air conditioner 225 starts operating, and can send a "stop" signal to the control unit 230 when the air conditioner 225 stops operating.

Because the operation of the air conditioner 225 reduces humidity, humidity monitoring is more accurate when the air conditioner 225 is not operating. For example, the door 238 may have a leaky seal that causes an air leak, resulting in a utility room humidity rise of 5% per hour. When the air conditioner 225 is operating, the humidity of the utility room measured by humidity sensor 210D may lower, e.g., by 10% or more per hour. Thus, when the air conditioner 225 is operating, the monitoring system 200 may not be able to detect the 5% per hour humidity rise due to the leaky seal of the door 238.

In some examples, the monitoring system 200 may perform humidity monitoring when the occupancy data 226 indicates that the property 202 is unoccupied for a designated period of time, and when the air conditioning data 228 indicates that the air conditioner 225 is not operating. By performing humidity monitoring while the property 202 is unoccupied, and while the air conditioner 225 is not operating, the monitoring system 200 can improve the accuracy of the humidity analysis.

The various sensors of the property 202 collect data throughout the property and send the data to a control unit 230 of the monitoring system 200. The control unit 230 may communicate with a remote monitoring server 250.

The motion sensors 212 can send motion sensor data 224 to the control unit 230. The control unit can determine occupancy data 226 based on the motion sensor data 224.

The control unit 230 receives sensor data from the various sensors at the property 202, including the humidity sensors 210 and the motion sensors 212. The control unit 230 can send the sensor data to a remote monitoring server 250. In some examples, the sensors communicate electronically with the control unit 230 through a network. In some examples, sensors can send the sensor data directly to the remote monitoring server 250.

FIG. 2 includes stages (A) through (E), which represent a flow of data. In stage (A) of FIG. 2, the control unit 230 receives humidity sensor data 222 from the humidity sensors 210, motion sensor data 224 from the motion sensors 212, and air conditioning data 228 from the air conditioner 225.

The motion sensor data 224 indicates no motion detected by the motion sensor 212A in the bathroom, by the motion sensor 212B in the kitchen, nor by the motion sensor 212C in the utility room. The air conditioning data 228 indicates that the air conditioner 225 is not operating.

The humidity sensor data 222 includes humidity levels measured by the humidity sensors 210. For example, the humidity sensor data 222 may include a humidity of 32% measured by humidity sensor 210A, 32% measured by humidity sensor 210B, and 40% measured by humidity sensor 210E. The humidity sensor data 222 may also include a humidity of 34% measured by humidity sensor 210C and 33% measured by humidity sensor 210D.

The control unit 230 receives the motion sensor data 224. The control unit 230 may analyze the motion sensor data 224, for example, to determine the occupancy data 226. The occupancy data 226 can include the occupancy of individual rooms of the property 202 and/or the occupancy of the property 202. For example, the occupancy data 226 can indicate that the property 202 is unoccupied. In some examples, the control unit 230 can determine the occupancy data 226 of the property 202 using additional sensors at the property 202 and/or using geolocation. In some examples, the control unit 230 can determine the occupancy data 226 based on motion sensor data 224, and can confirm the occupancy data 226 based on other sensor data and/or geolocation.

Based on determining that the air conditioner 225 is not operating and the property 202 is unoccupied, the control unit 230 may analyze the humidity sensor data 222. For example, the control unit 230 may determine a rate of change of humidity levels measured by each of the humidity sensors 210. For example, for the humidity sensor 210E, the control unit 230 may analyze the humidity sensor data 222 over the course of one hour, starting when the air conditioner 225 stops. The control unit 230 may determine a rate of change of +5% per hour for the humidity sensor 210E.

In stage (B) of FIG. 2, the control unit 230 sends the humidity sensor data 222 to the monitoring server 250 for analysis and determination of an action. The humidity sensor data 222 can include the humidity levels measured by the humidity sensors 210 and/or the rate of change of the humidity levels. The humidity sensor data 222 includes the rate of change of +5% per hour for humidity sensor 210E, and rates of change of +1% for humidity sensors 210A to 210D.

In stage (C) of FIG. 2, the control unit 230 sends occupancy data 226 to the monitoring server 250 for analysis and determination of an action. The occupancy data 226 can include the motion sensor data 224 measured by the motion sensors 212 and/or the assessed occupancy of various areas of the property. The occupancy data 226 indicates that the property 202 is unoccupied.

The monitoring server 250 receives weather data 264 from weather sensors 262. The weather data 264 may include, for example, the outdoor temperature and humidity at the property 202. In some examples, the monitoring server 250 receives the weather data 264 from weather sensors 262 located at the property 202, e.g., outdoor thermometers and/or outdoor humidity sensors. In some examples, the weather sensors 262 located at the property 202 may send the weather data 264 to the monitoring server 250 via the control unit 230. In some examples, the weather sensors 262 located at the property 202 may send the weather data 264 directly to the monitoring server 250. In some examples, the monitoring server 250 receives the weather data 264 from weather sensors 262 at a weather station, e.g., through an internet connection.

On a certain day, the weather data 264 from the weather sensors 262 may indicate that the outdoor humidity is 50%. Humidity sensor data 222 may indicate that the average indoor humidity is 34%. Thus, the outdoor humidity is higher than the indoor humidity. In these conditions, when the air conditioner 225 is not operating, the indoor humidity is expected to rise toward the outdoor humidity.

In stage (D) of FIG. 2, the monitoring server 250 analyzes the humidity sensor data 222 and the occupancy data 226. For example, the monitoring server 250 can analyze the occupancy data 226 to determine a length of time that the property 202 has been unoccupied. The monitoring server 250 may determine that the property 202 has been unoccupied for one hour.

The monitoring server 250 can analyze the humidity sensor data 222 to identify any anomalies in humidity at the property 202. The monitoring server 250 compares the rates of change of humidity levels of each of the humidity sensors 210. For example, the rates of change for humidity sensors 210A to 210D are +1% per hour, while the rate of change for the humidity sensor 210E is +5% per hour. Thus, the monitoring server 250 determines that the humidity measured by the humidity sensor 210E is rising faster than the humidity measured by the other humidity sensors 210A to 210D.

Based on analyzing the rates of change of the humidity levels measured by the humidity sensors 210, the monitoring server 250 may determine that there is an anomaly in the attic humidity. Since the property 202 has been unoccupied for one hour, the monitoring server 250 determines that the anomaly is not likely due to any human activity. Based on the property data model 254 that includes the locations of the humidity sensors 210 in relation to areas of the property 202, the monitoring server 250 may determine that the humidity anomaly is likely due to an air leak in the building envelope of the attic. Specifically, based on the proximity of the humidity sensor 210E to the attic window 240, the monitoring server 250 may determine that there is likely an air leak in or around the attic window 240.

In some examples, the monitoring server 250 may identify that an air leak is worsening over time. For example, the monitoring server 250 may determine that, under similar environmental conditions, the rate of change of humidity sensor 210E is +5% per hour on Monday, +7% per hour on Tuesday, and +10% per hour on Wednesday. Thus, the monitoring server 250 can determine that there is likely an air leak in or near the attic window 240, and that the leak is likely growing over time causing air to enter the building envelope at faster rate each day.

In some examples, the monitoring server 250 can determine if an increase in humidity is caused by a water leak or an air leak. For example, the weather data 264 may indicate that the outdoor humidity is 20%. Humidity sensor data 222 may indicate that the average indoor humidity is 34%. Thus, the outdoor humidity is lower than the indoor humidity. When the air conditioner 225 is not operating, and the property 202 is unoccupied, the indoor humidity is expected to lower toward the outdoor humidity. If one or more of the humidity sensors 210 detects an increase in humidity, the monitoring server 250 may determine that the source of the rise in humidity is internal to the property 202, and therefore is likely a water leak.

Based on analyzing the humidity sensor data 222 and occupancy data 226, the monitoring server 250 may take one or more actions. The monitoring server 250 may take one or more actions, e.g., based on pre-programmed rules, thresholds, and settings. For example, a rule may state that, while the property 202 is unoccupied, the monitoring server 250 sends a notification to the resident 214 for any humidity sensor data 222 that indicates a rate of change greater than 3% per hour.

In another example, a rule may be based on comparing the rates of change of each of the humidity sensors 210. A rule may state that the monitoring server 250 sends a notification 258 to the resident 214 for any rate of change of a humidity sensor that is more than 2% greater than the average rate of change of all humidity sensors 210. For example, the average rate of change of all humidity sensors 210A to 210E is the average of 1%, 1%, 1%, 1%, and 5%, or 1.8%. Since the 5% rate of change of humidity sensor 210E is more than 2% greater than 1.8%, the monitoring server 250 sends a notification 258 to the resident 214.

In stage (E) of FIG. 2, the monitoring server 250 takes an action of sending a notification 258 to one or more users, e.g., the resident 214. The monitoring server 250 can send the notification 258 to the resident 214 regarding the suspected air leak in the building envelop through the attic window 240. The monitoring server 250 can send the notification 258 to the resident 214 via a mobile device 216 and/or the control unit 230. The notification 258 may include the rate of change of the humidity sensor data 222 for the attic and/or the location of suspected building envelope air leak.

Though described above as being performed by a particular component of system 200 (e.g., the control unit 230 or the monitoring server 250), any of the various control, processing, and analysis operations can be performed by either the control unit 230, the monitoring server 250, or another computer system of the monitoring system 200. For example, the control unit 230, the monitoring server 250, or another computer system can analyze the data from the sensors to determine system actions. Similarly, the control unit 230, the monitoring server 250, or another computer system can control the various sensors, and/or property automation controls to collect data or control device operation.

Figure 3A:
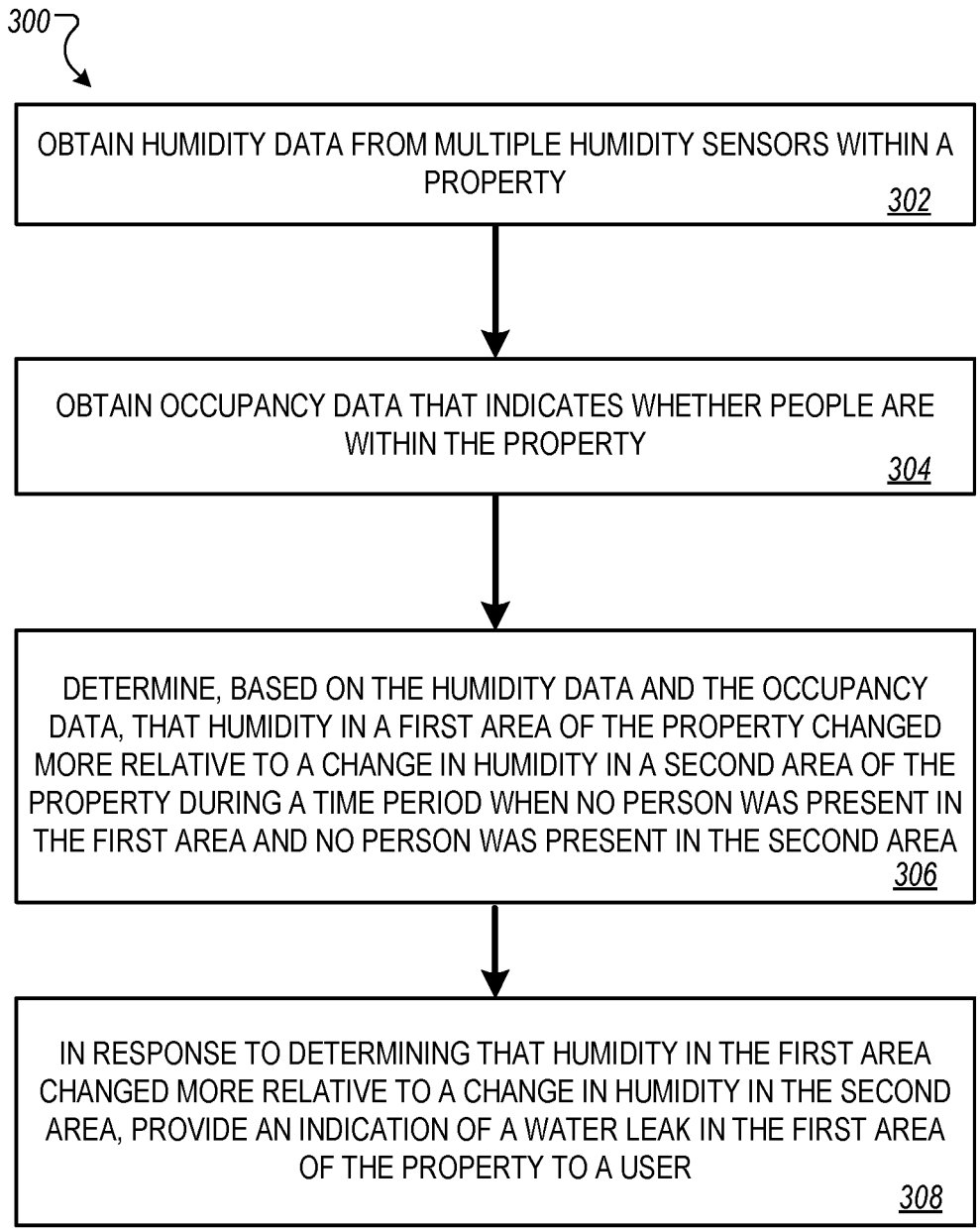
FIG. 3A is a flowchart of an example process for detecting a water leak using humidity monitoring.

FIG. 3A is a flowchart of an example process 300 for detecting a water leak using humidity monitoring. The process 300 can be performed by one or more computer systems of a monitoring system, for example, the humidity sensors 110, the monitoring server 150, or the control unit 130. In some implementations, some steps of the process 300 can be performed by the control unit 130, and other steps of the process can be performed by the monitoring server 150. In some examples, the control unit 130 or the monitoring server 150 may perform all of the steps of the process 300.

The process 300 includes obtaining humidity data from multiple humidity sensors within a property (302). The multiple humidity sensors can be, for example, the humidity sensors 110A to 110E with in the property 102.

The humidity data can include the humidity levels at various areas of the property. In some examples, the multiple humidity sensors include a first humidity sensor located in the first area of the property and a second humidity sensor located in the second area of the property. For example, the first humidity sensor may be the humidity sensor 110A, located in a first area that is the bathroom of the property 102. The second humidity sensor may be the humidity sensor 110B, located in a second area that is the kitchen of the property 102. The humidity sensor data 122 can therefore include humidity levels in the bathroom and in the kitchen of the property 102.

The process 300 includes obtaining occupancy data that indicates whether people are within the property (304). The occupancy data can include data indicating an occupancy of various areas of the property. For example, the occupancy data 126 can include data indicating an occupancy of each area of the property 102 including the kitchen and the bathroom. The occupancy data can be based on, for example, motion sensor data, video camera data, and/or geolocation data. The occupancy data may indicate that the bathroom and the kitchen are unoccupied, based on motion sensor data.

In some examples, the occupancy data includes one or more of occupant schedule data, motion sensor data, audio data, camera data, geolocation data; or an arming state of the monitoring system. Schedule data may indicate that the property 102 is unoccupied on weekdays between 8:00 am and 5:00 pm. Motion sensor data, e.g., the motion sensor data 124 generated by the motion sensors 112, may indicate whether motion is detected in the property 102, or in areas of the property 102. Audio data may indicate whether audible sounds are detected at the property. Camera data may indicate whether any people are visible in camera images collected at the property. Geolocation data may indicate whether devices associated with residents of the property, e.g., the mobile device 116 associated with the resident 114, are located within a designated geographic range to the property. The arming state of the monitoring system may indicate whether the property monitoring system is armed or unarmed.

The occupancy data may indicate that the property is unoccupied. For example, the motion sensor data 124 may indicate no motion at the property, the audio data may indicate no sound detected at the property, and/or the camera data may indicate that no people are visible in camera images collected at the property. The geolocation data may indicate that devices associated with residents of the property are not located within the designated geographic range, e.g., a quarter mile, to the property. The arming state of the monitoring system may be "armed, away."

In some examples, the process includes obtaining air conditioning data indicating an operating status of an air conditioning system at the property. The air conditioning data 228 can include data that indicates whether the air conditioner 225 is on or off. The air conditioning data 228 can also include data that indicates start and stop times for the air conditioner 225. For example, the air conditioning data 228 may include a start time of 1:35 pm, a stop time of 2:00 pm, and a start time of 2:45 pm.

In some examples, the process includes determining, based on the occupancy data, that the property is unoccupied. For example, based on motion sensor data 124 indicating no motion at the property and camera data indicating that no people are visible in camera images collected at the property, the system may determine that the property 102 is unoccupied.

In some examples, the process includes determining, based on the occupancy data, that the property became unoccupied at a particular time. For example, the occupancy data 126 may indicate that the monitoring system was set to "armed, away" at 8:05 am. The occupancy data 126 may also include geolocation data indicating that the mobile device 116 departed from the designated quarter-mile range at 8:08 am. Based on the occupancy data, the system may determine that the property 102 became unoccupied at 8:06 am.

Based on determining that the property became unoccupied at the particular time, the system can obtain first humidity data at a predetermined time duration after the particular time. For example, based on determining that the property 102 became unoccupied at 8:06 am, the system can obtain first humidity data at a predetermined time duration after 8:06 am. The predetermined time may be based on an estimated amount of time for humidity effects of the residents to dissipate. For example, a shower may be estimated to be the greatest contributor to humidity from actions of residents at the property 102. It may be also be estimated that humidity effects from a shower are likely dissipated after thirty minutes. Thus, the predetermined time duration for obtaining humidity data after the property becomes unoccupied may be set to a time greater than thirty minutes. For example, the predetermined time duration may be set to forty minutes. In this example, the system obtains first humidity data at the predetermined time duration of forty minutes after the property became unoccupied, e.g., 8:46 am.

In response to determining that the property is unoccupied, the system can obtain first humidity data at a first time. After obtaining the first humidity data at the first time, the system can determine that a predetermined time duration has elapsed since the first time. For example, the system can obtain first humidity data at a first time of 8:46 am. The system can then determine that a predetermined time duration has elapsed since the first time of 8:46 am. The predetermined time duration can be, for example, two hours. The first humidity data at the first time may indicate a humidity level of 40% in a first area that is the bathroom, and a humidity level of 40% in a second area that is the kitchen.

Based on determining that the predetermined time duration has elapsed since the first time, the system can obtain second humidity data at a second time. For example, the system can determine that two hours has elapsed since 8:46 am. The system can then obtain second humidity data at a second time of 10:46 am.

In some examples, after obtaining the first humidity data at the first time, the system can determine, based on the occupancy data, that one or more people have returned to the property or are returning to the property. For example, the occupancy data 126 may include the monitoring system status changing from "armed, away" to "unarmed, stay" at 10:32 am. The occupancy data 126 may also include motion detected at the property and camera image data showing people at the property around 10:32 am. Based on the occupancy data 126, the system can determine that one or more people have returned to the property 102 at 10:32 am. In another example, the occupancy data 126 may include geolocation data indicating that the mobile device 116 is approaching within the designated geographic range, e.g., a quarter mile, to the property 102 at 10:25 am. The occupancy data 126 may also include schedule data indicating that the resident 114 is scheduled to return to the property 102 at a certain time, e.g., 10:30 am. Based on the occupancy data 126, the system can determine that one or more people are returning to the property 102 around 10:30 am.

Based on determining that the one or more people have returned to the property or are returning to the property, the system can obtain second humidity data at a second time. For example, based on determining that one or more people have returned to the property 102 at 10:32 am, the system can obtain second humidity data at 10:32 am. In another example, based on determining that one or more people are returning to the property 102 around 10:30 am, the system can obtain second humidity data at 10:30 am. The second humidity data at the second time may indicate a humidity level of 60% in a first area that is the bathroom, and a humidity level of 43% in a second area that is the kitchen.

The system can determine, based on the first humidity data and the second humidity data, the change in humidity in the first area of the property and the change in humidity in the second area of the property during the time period from the first time to the second time. For example, the system can determine that humidity in the first area that is the bathroom increased from 40% to 60% during the time period from the first time to the second time, e.g., between 8:46 am to 10:46 am. The system can also determine that the humidity in the second area that is the kitchen increased from 40% to 43% from the first time to the second time.

The process 300 includes determining, based on the humidity data and the occupancy data, that humidity in a first area of the property changed more relative to a change in humidity in a second area of the property during a time period when no person was present in the first area and no person was present in the second area (306). In some examples, determining that the humidity in the first area of the property changed more relative to a change in humidity in a second area of the property includes determining that the humidity in the first area increased more relative to an increase in humidity in a second area of the property. For example, the system can determine that humidity in the first area of the property that is the bathroom changed by increasing 20% during the time period when no person was present in the bathroom and no person was present in the kitchen, e.g., the time period between 8:46 am and 10:46 am. The system can determine that humidity in the second area of the property that is the kitchen changed by increasing 3% during the same time period. Thus, the system can determine that the humidity in the bathroom changed more relative to the change in humidity in the kitchen while the property 102 was unoccupied. Specifically, the humidity in the bathroom increased 17% more, relative to the increase in humidity in the kitchen, while the property 102 was no person was in the bathroom or the kitchen.

In some examples, determining that humidity in the first area changed more relative to a change in humidity in a second area of the property includes determining that the relative change between the humidity in the first area and the humidity in the second area is greater than a threshold relative change in humidity. A threshold relative change in humidity may be, for example, 5% relative change per hour. In the above example, the relative change in humidity between the bathroom and the kitchen was 17% over a time period of two hours, or 8.5% per hour. Thus, the relative change in humidity of 8.5% exceeds the threshold relative change in humidity of 5% per hour.

In some examples, the process includes determining a first relative change between humidity in the first area of the property and humidity in the second area of the property during a first time period. The first time period may be a time period, e.g., of two hours on a first day. The first relative change may be 17% relative change between humidity in the bathroom and humidity in the kitchen during the first time period.

The system can then determine a second relative change between humidity in the first area of the property and humidity in the second area of the property during a second time period that is after the first time period. The second time period may be a time period, e.g., of two hours a second day. The second relative change may be 19% relative change between humidity in the bathroom and humidity in the kitchen during the second time period.

The process can include determining that the second relative change is greater than the first relative change. For example, the system can determine that the second relative change of 19% on the second day is greater than the first relative change of 17% on the first day.

In some examples, the process can include determining, based on the humidity data and the occupancy data, that humidity in a first area of the property changed more relative to a change in humidity in a second area of the property during a time period when the air conditioning system was not operating. For example, the air conditioning data may indicate an air conditioner stop time of 2:00 pm, and a start time of 2:45 pm. The humidity data may indicate a change of humidity in the bathroom of 10% during the time period when the air conditioning system was off, e.g., between 2:00 pm and 2:45 pm. The humidity data may indicate a change of humidity in the kitchen of 4% during the time period when the air conditioning system was off. Thus, the system can determine that the humidity in the first area that is the bathroom changed 6% more relative to the change in humidity in the second area that is the kitchen, while the air conditioning system was off.

The process 300 includes, in response to determining that humidity in the first area changed more relative to a change in humidity in the second area, providing an indication of a water leak in the first area of the property to a user (308). The user can be, for example, the resident 114. The indication of the water leak can include, for example, a notification to a mobile device of the resident 114, e.g., the mobile device 116. In response to determining that the humidity in the bathroom increased more relative to the change in humidity in the kitchen, the monitoring system can send the notification to the resident 114 that there is a suspected water leak in the bathroom.

In some examples, in response to determining that the second relative change from a second time period is greater than the first relative change from a first time period, the system can provide an indication to the user that the water leak in the first area of the property has worsened between the first time period and the second time period. For example, the system may determine that a second relative change of 19% between bathroom humidity and kitchen humidity on the second day is greater than a first relative change of 17% on the first day. Based on determining that the second relative change is greater than the first relative change, the system can provide an indication that the water leak in the bathroom has worsened between the first day and the second day.

In some examples, the process includes, in response to determining that humidity in the first area changed more relative to a change in humidity in a second area of the property during the time period when the air conditioning system was not operating, providing an indication of a water leak in the first area of the property to the user. For example, the system may determine that the humidity in the first area that is the bathroom changed 6% more relative to the change in humidity in the second area that is the kitchen, while the air conditioning system was off. In response to determining that the humidity in the bathroom changed more than the change in humidity in the kitchen, while the air conditioning system was off, the system can provide an indication of a water leak in the bathroom to the user, e.g., the resident 114.

In some examples, the process includes obtaining first humidity data from a first humidity sensor located in a first area and obtaining second humidity data from a second humidity sensor that is also located in the first area. For example, the first humidity sensor may be humidity sensor 110C located in a first area that is the utility room, and the second humidity sensor may be humidity sensor 110D, also located in the utility room.

The system may determine, based on the first humidity data and the second humidity data, that humidity near the first humidity sensor is greater than humidity near the second humidity sensor. For example, the humidity data may indicate a humidity of 65% measured by the humidity sensor 110C, and a humidity of 50% measured by the humidity sensor 110D. Therefore, the system can determine that humidity near the humidity sensor 110C is greater than humidity near the humidity sensor 110D.

Based on determining that humidity near the first humidity sensor is greater than humidity near the second humidity sensor, the system can determine that a location of the water leak is nearer to the first humidity sensor than to the second humidity sensor. For example, based on determining that humidity near the humidity sensor 110C is greater than humidity near the humidity sensor 110D, the system can determine that the location of the water leak is nearer to the humidity sensor 110C than to the humidity sensor 110D. Thus, the system may determine that the water leak is more likely coming from piping associated with the laundry machine 136 than from piping associated with the water heater 138.

In some examples, the process includes obtaining, from one or more sensors at the property; sensor data; and determining, based on the humidity data and the sensor data, a source of the water leak. In some examples, the sensor data includes one or more of camera data, audio data, or water flow data. For example, camera data may include images of water dripping or pooling near the sink in the bathroom. Audio data may include sounds of water dripping or flowing from the sink in the bathroom. Water flow data may indicate an unexpected change in water flow through a pipe leading to the sink in the bathroom. Based on the humidity data indicating humidity levels in the bathroom, and sensor data from the bathroom, the system may determine that the source of the water leak is the sink in the bathroom.

Figure 3B:
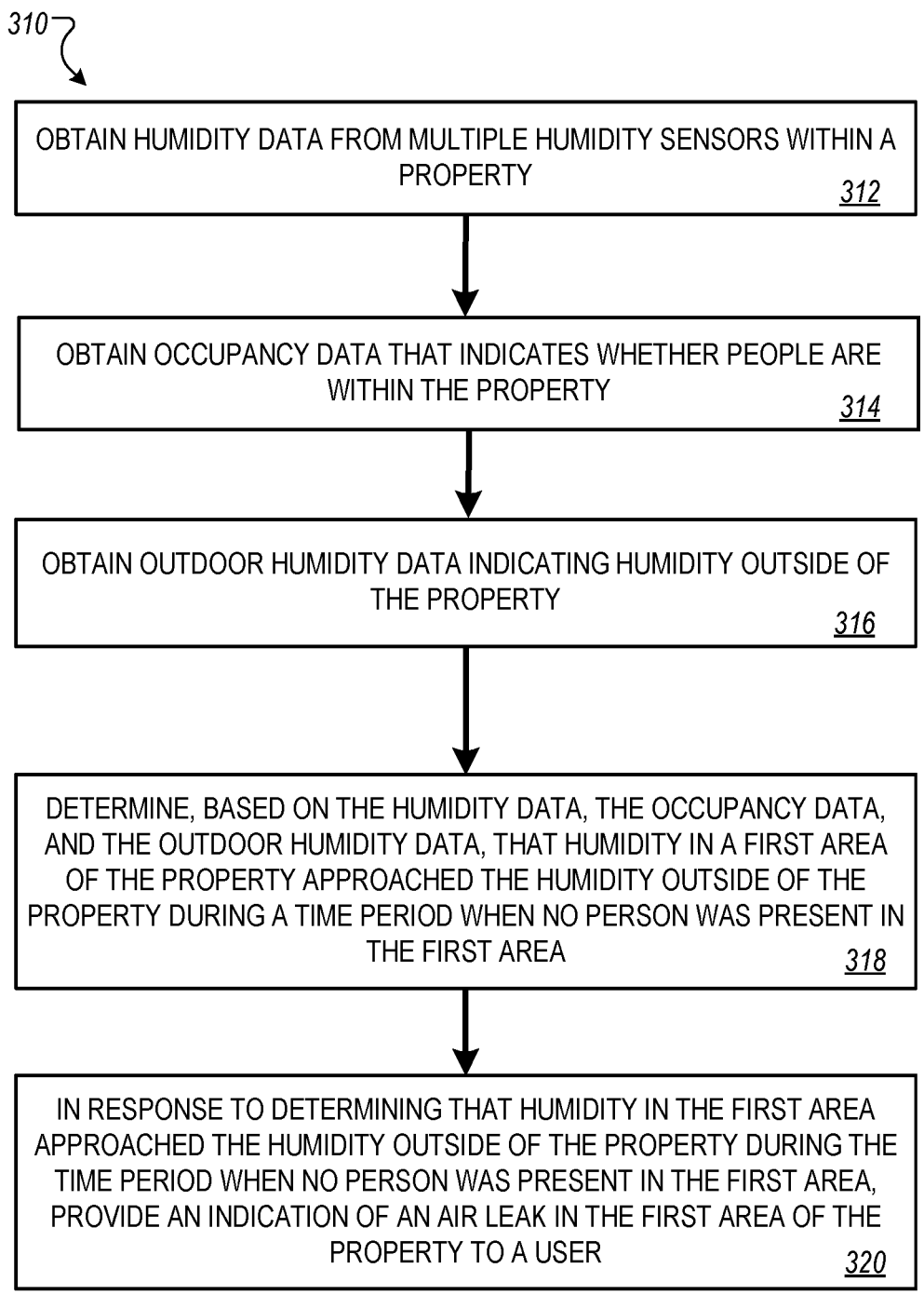
FIG. 3B is a flowchart of an example process for detecting an air leak using humidity monitoring.

FIG. 3B is a flowchart of an example process 310 for detecting an air leak using humidity monitoring. The process 310 can be performed by one or more computer systems, for example, the humidity sensors 110, the monitoring server 150, or the control unit 130. In some implementations, some steps of the process 310 can be performed by the control unit 130, and other steps of the process can be performed by the monitoring server 150. In some examples, the control unit 130 or the monitoring server 150 may perform all of the steps of the process 310.

Similar to the process 300, the process 310 includes obtaining humidity data from multiple humidity sensors within a property (312) and obtaining occupancy data that indicates whether people are within the property (314). For example, the multiple humidity sensors may include the humidity sensors 210 within the property 202. The occupancy data may indicate that no people are within the property between 11:00 am and 3:00 pm.

The process 310 includes obtaining outdoor humidity data indicating humidity outside of the property (316). For example, the system may obtain outdoor humidity data from weather sensors 262. The weather sensors 262 may include weather sensors located at the property 202, e.g., a humidity sensor installed outside of the property 202. In some examples, the weather sensors 262 may include weather sensors located at a weather station. The system may obtain the humidity data indicating humidity outside of the property from the weather station, e.g., through the internet. The humidity data may indicate that humidity outside of the property is approximately steady at 50% between 11:00 am and 3:00 pm.

Similar to the process 300, in some examples, the process 310 includes obtaining air conditioning data indicating an operating status of an air conditioning system at the property. The air conditioning data may indicate an on/off status of an air conditioner or heat pump system, and may include start and stop times for the air conditioning system. The air conditioning data may indicate the air conditioner starting at 12:00 pm, stopping at 12:45 pm, and starting at 2:15 pm.

The process 310 includes determining, based on the humidity data, the outdoor humidity data, and the occupancy data, that humidity in a first area of the property approached the humidity outside of the property during a time period when no person was present in the first area (318). In some examples, determining that the humidity in the first area approached the humidity outside of the property during the time period includes determining that the humidity in the first area decreased during the time period to approach the humidity outside of the property. For example, a first area may be the kitchen of the property 202. The outdoor humidity may be 50%. Between 11:00 am and 3:00 pm, when no person was present in the kitchen, the humidity in the kitchen may change from a humidity of 65% to 55%. The system can therefore determine that the humidity in the kitchen approached the humidity outside of the property during the time period when no person was present in the kitchen.

In some examples, the process 310 includes determining that humidity in a first area of the property approached the humidity outside of the property during a time period when the air conditioning system was not operating. For example, the air conditioning data may indicate that the air conditioning system was not operating between 12:45 pm and 2:15 pm. The outdoor humidity may be 50%. Between 12:45 pm and 2:15 pm, the humidity in the kitchen may change from a humidity of 62% to 57%. The system can therefore determine that the humidity in the kitchen approached the humidity outside of the property during the time period when the air conditioning system was not operating.

The process 310 includes, in response to determining that humidity in the first area approached the humidity outside of the property during the time period when no person was present in the first area, providing an indication of an air leak in the first area of the property to a user (320). For example, in response to determining that humidity in the kitchen approached the humidity outside of the property between 11:00 am and 3:00 pm when the property is unoccupied, the system can provide an indication of an air leak in the kitchen to the resident 214.

In some examples, the process 310 includes, in response to determining that humidity in the first area approached the humidity outside of the property during the time period when the air conditioning system was not operating, providing an indication of an air leak in the first area of the property to a user. For example, in response to determining that humidity in the kitchen approached the humidity outside of the property between 12:45 pm and 2:15 pm when the air conditioning system was not operating, the system can provide an indication of an air leak in the kitchen to the resident 114.

Figure 4:
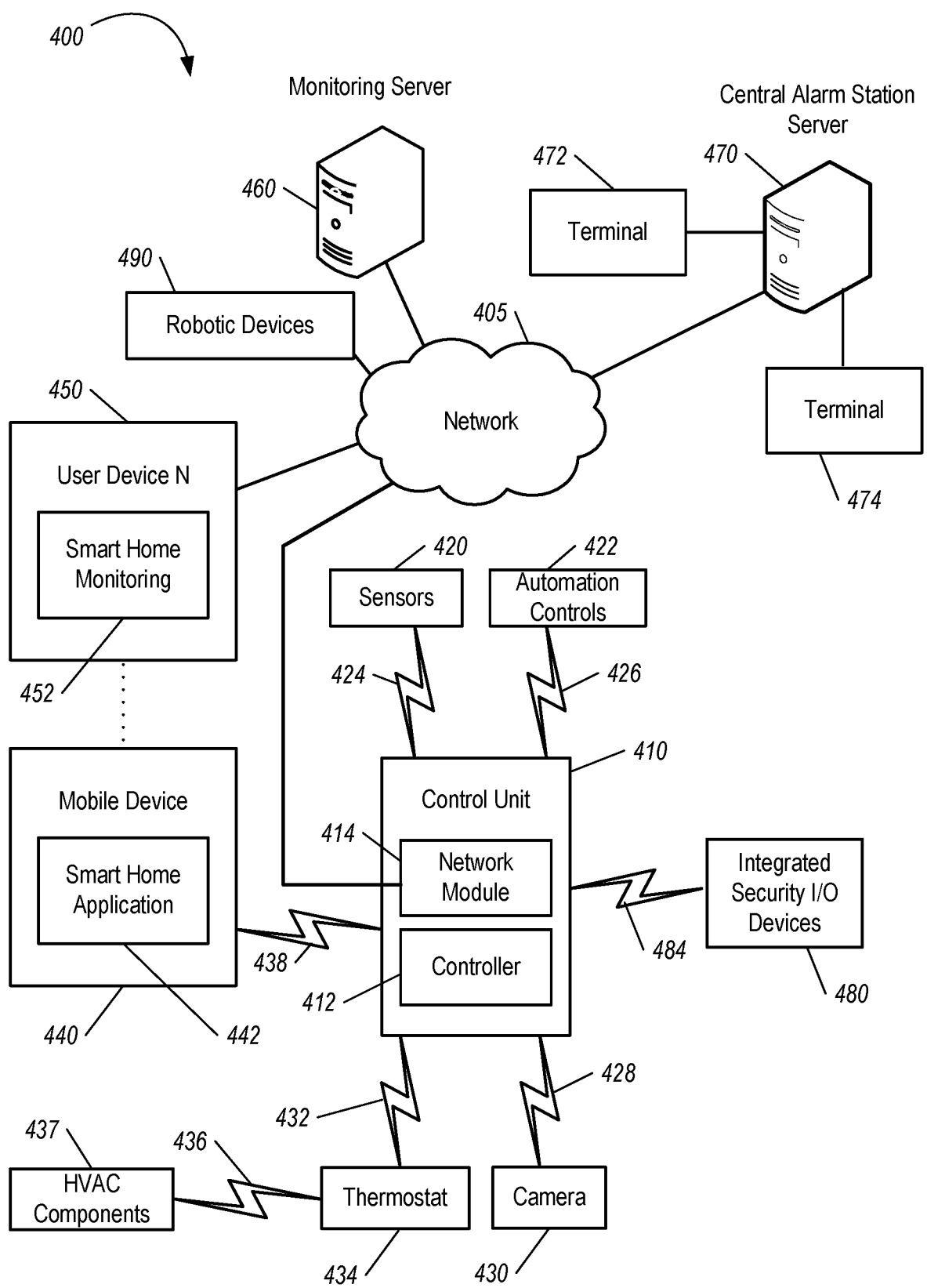
FIG. 4 shows a diagram illustrating an example monitoring system that includes humidity monitoring.

FIG. 4 is a diagram illustrating an example of a home monitoring system 400. The monitoring system 400 includes a network 405, a control unit 410, one or more user devices 440 and 450, a monitoring server 460, and a central alarm station server 470. In some examples, the network 405 facilitates communications between the control unit 410, the one or more user devices 440 and 450, the monitoring server 460, and the central alarm station server 470.

The network 405 is configured to enable exchange of electronic communications between devices connected to the network 405. For example, the network 405 may be configured to enable exchange of electronic communications between the control unit 410, the one or more user devices 440 and 450, the monitoring server 460, and the central alarm station server 470. The network 405 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 405 may include multiple networks or subnetworks, each of which may include, for example, a wired or wireless data pathway. The network 405 may include a circuit-switched network, a packet-switched data network, or any other network able to carry electronic communications (e.g., data or voice communications). For example, the network 405 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 405 may include one or more networks that include wireless data channels and wireless voice channels. The network 405 may be a wireless network, a broadband network, or a combination of networks including a wireless network and a broadband network.

The control unit 410 includes a controller 412 and a network module 414. The controller 412 is configured to control a control unit monitoring system (e.g., a control unit system) that includes the control unit 410. In some examples, the controller 412 may include a processor or other control circuitry configured to execute instructions of a program that controls operation of a control unit system. In these examples, the controller 412 may be configured to receive input from sensors, flow meters, or other devices included in the control unit system and control operations of devices included in the household (e.g., speakers, lights, doors, etc.). For example, the controller 412 may be configured to control operation of the network module 414 included in the control unit 410.

The network module 414 is a communication device configured to exchange communications over the network 405. The network module 414 may be a wireless communication module configured to exchange wireless communications over the network 405. For example, the network module 414 may be a wireless communication device configured to exchange communications over a wireless data channel and a wireless voice channel. In this example, the network module 414 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 414 also may be a wired communication module configured to exchange communications over the network 405 using a wired connection. For instance, the network module 414 may be a modem, a network interface card, or another type of network interface device. The network module 414 may be an Ethernet network card configured to enable the control unit 410 to communicate over a local area network and/or the Internet. The network module 414 also may be a voice band modem configured to enable the alarm panel to communicate over the telephone lines of Plain Old Telephone Systems (POTS).

The control unit system that includes the control unit 410 includes one or more sensors. For example, the monitoring system may include multiple sensors 420. The sensors 420 may include a lock sensor, a contact sensor, a motion sensor, or any other type of sensor included in a control unit system. The sensors 420 also may include an environmental sensor, such as an indoor humidity sensor, an outdoor humidity sensor, a temperature sensor, a water sensor, a rain sensor, a wind sensor, a light sensor, a smoke detector, a carbon monoxide detector, an air quality sensor, etc. The sensors 420 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health-monitoring sensor can be a wearable sensor that attaches to a user in the home. The health-monitoring sensor can collect various health data, including pulse, heart rate, respiration rate, sugar or glucose level, bodily temperature, or motion data.

The sensors 420 can also include a radio-frequency identification (RFID) sensor that identifies a particular article that includes a pre-assigned RFID tag.

The control unit 410 communicates with the home automation controls 422 and a camera 430 to perform monitoring. The home automation controls 422 are connected to one or more devices that enable automation of actions in the home. For instance, the home automation controls 422 may be connected to one or more lighting systems and may be configured to control operation of the one or more lighting systems. In addition, the home automation controls 422 may be connected to one or more electronic locks at the home and may be configured to control operation of the one or more electronic locks (e.g., control Z-Wave locks using wireless communications in the Z-Wave protocol). Further, the home automation controls 422 may be connected to one or more appliances at the home and may be configured to control operation of the one or more appliances. The home automation controls 422 may include multiple modules that are each specific to the type of device being controlled in an automated manner. The home automation controls 422 may control the one or more devices based on commands received from the control unit 410. For instance, the home automation controls 422 may cause a lighting system to illuminate an area to provide a better image of the area when captured by a camera 430.

The camera 430 may be a video/photographic camera or other type of optical sensing device configured to capture images. For instance, the camera 430 may be configured to capture images of an area within a building or home monitored by the control unit 410. The camera 430 may be configured to capture single, static images of the area and also video images of the area in which multiple images of the area are captured at a relatively high frequency (e.g., thirty images per second). The camera 430 may be controlled based on commands received from the control unit 410.

The camera 430 may be triggered by several different types of techniques. For instance, a Passive Infra-Red (PIR) motion sensor may be built into the camera 430 and used to trigger the camera 430 to capture one or more images when motion is detected. The camera 430 also may include a microwave motion sensor built into the camera and used to trigger the camera 430 to capture one or more images when motion is detected. The camera 430 may have a "normally open" or "normally closed" digital input that can trigger capture of one or more images when external sensors (e.g., the sensors 420, PIR, door/window, etc.) detect motion or other events. In some implementations, the camera 430 receives a command to capture an image when external devices detect motion or another potential alarm event. The camera 430 may receive the command from the controller 412 or directly from one of the sensors 420.

In some examples, the camera 430 triggers integrated or external illuminators (e.g., Infra-Red, Z-wave controlled "white" lights, lights controlled by the home automation controls 422, etc.) to improve image quality when the scene is dark. An integrated or separate light sensor may be used to determine if illumination is desired and may result in increased image quality.

The camera 430 may be programmed with any combination of time/day schedules, system "arming state", or other variables to determine whether images should be captured or not when triggers occur. The camera 430 may enter a low-power mode when not capturing images. In this case, the camera 430 may wake periodically to check for inbound messages from the controller 412. The camera 430 may be powered by internal, replaceable batteries if located remotely from the control unit 410. The camera 430 may employ a small solar cell to recharge the battery when light is available. Alternatively, the camera 430 may be powered by the controller's 412 power supply if the camera 430 is co-located with the controller 412.

In some implementations, the camera 430 communicates directly with the monitoring server 460 over the Internet. In these implementations, image data captured by the camera 430 does not pass through the control unit 410 and the camera 430 receives commands related to operation from the monitoring server 460.

The system 400 also includes thermostat 434 to perform dynamic environmental control at the home. The thermostat 434 is configured to monitor temperature and/or energy consumption of an HVAC system associated with the thermostat 434, and is further configured to provide control of environmental (e.g., temperature) settings. In some implementations, the thermostat 434 can additionally or alternatively receive data relating to activity at a home and/or environmental data at a home, e.g., at various locations indoors and outdoors at the home. The thermostat 434 can directly measure energy consumption of the HVAC system associated with the thermostat, or can estimate energy consumption of the HVAC system associated with the thermostat 434, for example, based on detected usage of one or more components of the HVAC system associated with the thermostat 434. The thermostat 434 can communicate temperature and/or energy monitoring information to or from the control unit 410 and can control the environmental (e.g., temperature) settings based on commands received from the control unit 410.

In some implementations, the thermostat 434 is a dynamically programmable thermostat and can be integrated with the control unit 410. For example, the dynamically programmable thermostat 434 can include the control unit 410, e.g., as an internal component to the dynamically programmable thermostat 434. In addition, the control unit 410 can be a gateway device that communicates with the dynamically programmable thermostat 434. In some implementations, the thermostat 434 is controlled via one or more home automation controls 422.

A module 437 is connected to one or more components of an HVAC system associated with a home, and is configured to control operation of the one or more components of the HVAC system. In some implementations, the module 437 is also configured to monitor energy consumption of the HVAC system components, for example, by directly measuring the energy consumption of the HVAC system components or by estimating the energy usage of the one or more HVAC system components based on detecting usage of components of the HVAC system. The module 437 can communicate energy monitoring information and the state of the HVAC system components to the thermostat 434 and can control the one or more components of the HVAC system based on commands received from the thermostat 434.

In some examples, the system 400 further includes one or more robotic devices 490. The robotic devices 490 may be any type of robots that are capable of moving and taking actions that assist in home monitoring. For example, the robotic devices 490 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and roll along the ground, walls, or ceiling) and land vehicle type devices (e.g., automated cars that drive around a home). In some cases, the robotic devices 490 may be devices that are intended for other purposes and merely associated with the system 400 for use in appropriate circumstances. For instance, a robotic vacuum cleaner device may be associated with the monitoring system 400 as one of the robotic devices 490 and may be controlled to take action responsive to monitoring system events.

In some examples, the robotic devices 490 automatically navigate within a home. In these examples, the robotic devices 490 include sensors and control processors that guide movement of the robotic devices 490 within the home. For instance, the robotic devices 490 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 490 may include control processors that process output from the various sensors and control the robotic devices 490 to move along a path that reaches the desired destination and avoids obstacles. In this regard, the control processors detect walls or other obstacles in the home and guide movement of the robotic devices 490 in a manner that avoids the walls and other obstacles.

In addition, the robotic devices 490 may store data that describes attributes of the home. For instance, the robotic devices 490 may store a floorplan and/or a three-dimensional model of the home that enables the robotic devices 490 to navigate the home. During initial configuration, the robotic devices 490 may receive the data describing attributes of the home, determine a frame of reference to the data (e.g., a home or reference location in the home), and navigate the home based on the frame of reference and the data describing attributes of the home. Further, initial configuration of the robotic devices 490 also may include learning of one or more navigation patterns in which a user provides input to control the robotic devices 490 to perform a specific navigation action (e.g., fly to an upstairs bedroom and spin around while capturing video and then return to a home charging base). In this regard, the robotic devices 490 may learn and store the navigation patterns such that the robotic devices 490 may automatically repeat the specific navigation actions upon a later request.

In some examples, the robotic devices 490 may include data capture and recording devices. In these examples, the robotic devices 490 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 490 to take and store a biometric sample that can be used to identify the person (e.g., a biometric sample with DNA that can be used for DNA testing).

In some implementations, the robotic devices 490 may include output devices. In these implementations, the robotic devices 490 may include one or more displays, one or more speakers, and/or any type of output devices that allow the robotic devices 490 to communicate information to a nearby user.

The robotic devices 490 also may include a communication module that enables the robotic devices 490 to communicate with the control unit 410, each other, and/or other devices. The communication module may be a wireless communication module that allows the robotic devices 490 to communicate wirelessly. For instance, the communication module may be a Wi-Fi module that enables the robotic devices 490 to communicate over a local wireless network at the home. The communication module further may be a 900 MHz wireless communication module that enables the robotic devices 490 to communicate directly with the control unit 410. Other types of short-range wireless communication protocols, such as Bluetooth, Bluetooth LE, Z-wave, Zigbee, etc., may be used to allow the robotic devices 490 to communicate with other devices in the home. In some implementations, the robotic devices 490 may communicate with each other or with other devices of the system 400 through the network 405.

The robotic devices 490 further may include processor and storage capabilities. The robotic devices 490 may include any suitable processing devices that enable the robotic devices 490 to operate applications and perform the actions described throughout this disclosure. In addition, the robotic devices 490 may include solid-state electronic storage that enables the robotic devices 490 to store applications, configuration data, collected sensor data, and/or any other type of information available to the robotic devices 490.

The robotic devices 490 are associated with one or more charging stations. The charging stations may be located at predefined home base or reference locations in the home. The robotic devices 490 may be configured to navigate to the charging stations after completion of tasks needed to be performed for the monitoring system 400. For instance, after completion of a monitoring operation or upon instruction by the control unit 410, the robotic devices 490 may be configured to automatically fly to and land on one of the charging stations. In this regard, the robotic devices 490 may automatically maintain a fully charged battery in a state in which the robotic devices 490 are ready for use by the monitoring system 400.

The charging stations may be contact based charging stations and/or wireless charging stations. For contact based charging stations, the robotic devices 490 may have readily accessible points of contact that the robotic devices 490 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 490 may charge through a wireless exchange of power. In these cases, the robotic devices 490 need only locate themselves closely enough to the wireless charging stations for the wireless exchange of power to occur. In this regard, the positioning needed to land at a predefined home base or reference location in the home may be less precise than with a contact based charging station. Based on the robotic devices 490 landing at a wireless charging station, the wireless charging station outputs a wireless signal that the robotic devices 490 receive and convert to a power signal that charges a battery maintained on the robotic devices 490.

In some implementations, each of the robotic devices 490 has a corresponding and assigned charging station such that the number of robotic devices 490 equals the number of charging stations. In these implementations, the robotic devices 490 always navigate to the specific charging station assigned to that robotic device. For instance, a first robotic device may always use a first charging station and a second robotic device may always use a second charging station.

In some examples, the robotic devices 490 may share charging stations. For instance, the robotic devices 490 may use one or more community charging stations that are capable of charging multiple robotic devices 490. The community charging station may be configured to charge multiple robotic devices 490 in parallel. The community charging station may be configured to charge multiple robotic devices 490 in serial such that the multiple robotic devices 490 take turns charging and, when fully charged, return to a predefined home base or reference location in the home that is not associated with a charger. The number of community charging stations may be less than the number of robotic devices 490.

In addition, the charging stations may not be assigned to specific robotic devices 490 and may be capable of charging any of the robotic devices 490. In this regard, the robotic devices 490 may use any suitable, unoccupied charging station when not in use. For instance, when one of the robotic devices 490 has completed an operation or is in need of battery charge, the control unit 410 references a stored table of the occupancy status of each charging station and instructs the robotic device to navigate to the nearest charging station that is unoccupied.

The system 400 further includes one or more integrated security devices 480. The one or more integrated security devices may include any type of device used to provide alerts based on received sensor data. For instance, the one or more control units 410 may provide one or more alerts to the one or more integrated security input/output devices 480. Additionally, the one or more control units 410 may receive one or more sensor data from the sensors 420 and determine whether to provide an alert to the one or more integrated security input/output devices 480.

The sensors 420, the home automation controls 422, the camera 430, the thermostat 434, and the integrated security devices 480 may communicate with the controller 412 over communication links 424, 426, 428, 432, 438, and 484. The communication links 424, 426, 428, 432, 438, and 484 may be a wired or wireless data pathway configured to transmit signals from the sensors 420, the home automation controls 422, the camera 430, the thermostat 434, and the integrated security devices 480 to the controller 412. The sensors 420, the home automation controls 422, the camera 430, the thermostat 434, and the integrated security devices 480 may continuously transmit sensed values to the controller 412, periodically transmit sensed values to the controller 412, or transmit sensed values to the controller 412 in response to a change in a sensed value.

The communication links 424, 426, 428, 432, 438, and 484 may include a local network. The sensors 420, the home automation controls 422, the camera 430, the thermostat 434, and the integrated security devices 480, and the controller 412 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 460 is an electronic device configured to provide monitoring services by exchanging electronic communications with the control unit 410, the one or more user devices 440 and 450, and the central alarm station server 470 over the network 405. For example, the monitoring server 460 may be configured to monitor events generated by the control unit 410. In this example, the monitoring server 460 may exchange electronic communications with the network module 414 included in the control unit 410 to receive information regarding events detected by the control unit 410. The monitoring server 460 also may receive information regarding events from the one or more user devices 440 and 450.

In some examples, the monitoring server 460 may route alert data received from the network module 414 or the one or more user devices 440 and 450 to the central alarm station server 470. For example, the monitoring server 460 may transmit the alert data to the central alarm station server 470 over the network 405.

The monitoring server 460 may store sensor and image data received from the monitoring system and perform analysis of sensor and image data received from the monitoring system. Based on the analysis, the monitoring server 460 may communicate with and control aspects of the control unit 410 or the one or more user devices 440 and 450.

The monitoring server 460 may provide various monitoring services to the system 400. For example, the monitoring server 460 may analyze the sensor, image, and other data to determine an activity pattern of a resident of the home monitored by the system 400. In some implementations, the monitoring server 460 may analyze the data for alarm conditions or may determine and perform actions at the home by issuing commands to one or more of the controls 422, possibly through the control unit 410.

The monitoring server 460 can be configured to provide information (e.g., activity patterns) related to one or more residents of the home monitored by the system 400 (e.g., the resident 114). For example, one or more of the sensors 420, the home automation controls 422, the camera 430, the thermostat 434, and the integrated security devices 480 can collect data related to a resident including location information (e.g., if the resident is home or is not home) and provide location information to the thermostat 434.

The central alarm station server 470 is an electronic device configured to provide alarm monitoring service by exchanging communications with the control unit 410, the one or more user devices 440 and 450, and the monitoring server 460 over the network 405. For example, the central alarm station server 470 may be configured to monitor alerting events generated by the control unit 410. In this example, the central alarm station server 470 may exchange communications with the network module 414 included in the control unit 410 to receive information regarding alerting events detected by the control unit 410. The central alarm station server 470 also may receive information regarding alerting events from the one or more user devices 440 and 450 and/or the monitoring server 460.

The central alarm station server 470 is connected to multiple terminals 472 and 474. The terminals 472 and 474 may be used by operators to process alerting events. For example, the central alarm station server 470 may route alerting data to the terminals 472 and 474 to enable an operator to process the alerting data. The terminals 472 and 474 may include general-purpose computers (e.g., desktop personal computers, workstations, or laptop computers) that are configured to receive alerting data from a server in the central alarm station server 470 and render a display of information based on the alerting data. For instance, the controller 412 may control the network module 414 to transmit, to the central alarm station server 470, alerting data indicating that a sensor 420 detected motion from a motion sensor via the sensors 420. The central alarm station server 470 may receive the alerting data and route the alerting data to the terminal 472 for processing by an operator associated with the terminal 472. The terminal 472 may render a display to the operator that includes information associated with the alerting event (e.g., the lock sensor data, the motion sensor data, the contact sensor data, etc.) and the operator may handle the alerting event based on the displayed information.

In some implementations, the terminals 472 and 474 may be mobile devices or devices designed for a specific function. Although FIG. 4 illustrates two terminals for brevity, actual implementations may include more (and, perhaps, many more) terminals.

The one or more authorized user devices 440 and 450 are devices that host and display user interfaces. For instance, the user device 440 is a mobile device that hosts or runs one or more native applications (e.g., the home monitoring application 442). The user device 440 may be a cellular phone or a non-cellular locally networked device with a display. The user device 440 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 440 may perform functions unrelated to the monitoring system, such as placing personal telephone calls, playing music, playing video, displaying pictures, browsing the Internet, maintaining an electronic calendar, etc.

The user device 440 includes a home monitoring application 442. The home monitoring application 442 refers to a software/firmware program running on the corresponding mobile device that enables the user interface and features described throughout. The user device 440 may load or install the home monitoring application 442 based on data received over a network or data received from local media. The home monitoring application 442 runs on mobile devices platforms, such as iPhone, iPod touch, Blackberry, Google Android, Windows Mobile, etc. The home monitoring application 442 enables the user device 440 to receive and process image and sensor data from the monitoring system.

The user device 440 may be a general-purpose computer (e.g., a desktop personal computer, a workstation, or a laptop computer) that is configured to communicate with the monitoring server 460 and/or the control unit 410 over the network 405. The user device 440 may be configured to display a smart home user interface 452 that is generated by the user device 440 or generated by the monitoring server 460. For example, the user device 440 may be configured to display a user interface (e.g., a web page) provided by the monitoring server 460 that enables a user to perceive images captured by the camera 430 and/or reports related to the monitoring system. Although FIG. 4 illustrates two user devices for brevity, actual implementations may include more (and, perhaps, many more) or fewer user devices.

In some implementations, the one or more user devices 440 and 450 communicate with and receive monitoring system data from the control unit 410 using the communication link 438. For instance, the one or more user devices 440 and 450 may communicate with the control unit 410 using various local wireless protocols such as Wi-Fi, Bluetooth, Z-wave, Zigbee, HomePlug (ethernet over power line), or wired protocols such as Ethernet and USB, to connect the one or more user devices 440 and 450 to local security and automation equipment. The one or more user devices 440 and 450 may connect locally to the monitoring system and its sensors and other devices. The local connection may improve the speed of status and control communications because communicating through the network 405 with a remote server (e.g., the monitoring server 460) may be significantly slower.

Although the one or more user devices 440 and 450 are shown as communicating with the control unit 410, the one or more user devices 440 and 450 may communicate directly with the sensors and other devices controlled by the control unit 410. In some implementations, the one or more user devices 440 and 450 replace the control unit 410 and perform the functions of the control unit 410 for local monitoring and long range/offsite communication.

In other implementations, the one or more user devices 440 and 450 receive monitoring system data captured by the control unit 410 through the network 405. The one or more user devices 440, 450 may receive the data from the control unit 410 through the network 405 or the monitoring server 460 may relay data received from the control unit 410 to the one or more user devices 440 and 450 through the network 405. In this regard, the monitoring server 460 may facilitate communication between the one or more user devices 440 and 450 and the monitoring system.

In some implementations, the one or more user devices 440 and 450 may be configured to switch whether the one or more user devices 440 and 450 communicate with the control unit 410 directly (e.g., through link 438) or through the monitoring server 460 (e.g., through network 405) based on a location of the one or more user devices 440 and 450. For instance, when the one or more user devices 440 and 450 are located close to the control unit 410 and in range to communicate directly with the control unit 410, the one or more user devices 440 and 450 use direct communication. When the one or more user devices 440 and 450 are located far from the control unit 410 and not in range to communicate directly with the control unit 410, the one or more user devices 440 and 450 use communication through the monitoring server 460.

Although the one or more user devices 440 and 450 are shown as being connected to the network 405, in some implementations, the one or more user devices 440 and 450 are not connected to the network 405. In these implementations, the one or more user devices 440 and 450 communicate directly with one or more of the monitoring system components and no network (e.g., Internet) connection or reliance on remote servers is needed.

In some implementations, the one or more user devices 440 and 450 are used in conjunction with only local sensors and/or local devices in a house. In these implementations, the system 400 includes the one or more user devices 440 and 450, the sensors 420, the home automation controls 422, the camera 430, and the robotic devices 490. The one or more user devices 440 and 450 receive data directly from the sensors 420, the home automation controls 422, the camera 430, and the robotic devices 490, and sends data directly to the sensors 420, the home automation controls 422, the camera 430, and the robotic devices 490. The one or more user devices 440, 450 provide the appropriate interfaces/processing to provide visual surveillance and reporting.

In other implementations, the system 400 further includes network 405 and the sensors 420, the home automation controls 422, the camera 430, the thermostat 434, and the robotic devices 490, and are configured to communicate sensor and image data to the one or more user devices 440 and 450 over network 405 (e.g., the Internet, cellular network, etc.). In yet another implementation, the sensors 420, the home automation controls 422, the camera 430, the thermostat 434, and the robotic devices 490 (or a component, such as a bridge/router) are intelligent enough to change the communication pathway from a direct local pathway when the one or more user devices 440 and 450 are in close physical proximity to the sensors 420, the home automation controls 422, the camera 430, the thermostat 434, and the robotic devices 490 to a pathway over network 405 when the one or more user devices 440 and 450 are farther from the sensors 420, the home automation controls 422, the camera 430, the thermostat 434, and the robotic devices 490.

In some examples, the system leverages GPS information from the one or more user devices 440 and 450 to determine whether the one or more user devices 440 and 450 are close enough to the sensors 420, the home automation controls 422, the camera 430, the thermostat 434, and the robotic devices 490 to use the direct local pathway or whether the one or more user devices 440 and 450 are far enough from the sensors 420, the home automation controls 422, the camera 430, the thermostat 434, and the robotic devices 490 that the pathway over network 405 is required.

In other examples, the system leverages status communications (e.g., pinging) between the one or more user devices 440 and 450 and the sensors 420, the home automation controls 422, the camera 430, the thermostat 434, and the robotic devices 490 to determine whether communication using the direct local pathway is possible. If communication using the direct local pathway is possible, the one or more user devices 440 and 450 communicate with the sensors 420, the home automation controls 422, the camera 430, the thermostat 434, and the robotic devices 490 using the direct local pathway. If communication using the direct local pathway is not possible, the one or more user devices 440 and 450 communicate with the sensors 420, the home automation controls 422, the camera 430, the thermostat 434, and the robotic devices 490 using the pathway over network 405.

In some implementations, the system 400 provides end users with access to images captured by the camera 430 to aid in decision making. The system 400 may transmit the images captured by the camera 430 over a wireless WAN network to the user devices 440 and 450. Because transmission over a wireless WAN network may be relatively expensive, the system 400 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 430). In these implementations, the camera 430 may be set to capture images on a periodic basis when the alarm system is armed in an "away" state, but set not to capture images when the alarm system is armed in a "home" state or disarmed. In addition, the camera 430 may be triggered to begin capturing images when the alarm system detects an event, such as an alarm event, a door-opening event for a door that leads to an area within a field of view of the camera 430, or motion in the area within the field of view of the camera 430. In other implementations, the camera 430 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A monitoring system for monitoring a property, the monitoring system comprising one or more processors and one or more computer storage media storing instructions that are operable, when executed by the one or more processors, to cause the one or more processors to perform operations comprising:
    obtaining occupancy data that indicates whether people are within the property;
    determining, using the occupancy data, that the property became unoccupied at a particular time;
    in response to determining that the property became unoccupied at the particular time, obtaining, from multiple humidity sensors within the property, first humidity data at a first time, the first time being a predetermined time duration after the particular time when the property became unoccupied;
    obtaining, from the multiple humidity sensors, second humidity data at a second time;
    determining, using the first humidity data and the second humidity data, a change in humidity in a first area of the property and a change in humidity in a second area of the property during a time period from the first time to the second time;
    determining that the change in humidity in the first area of the property is greater than the change in humidity in the second area of the property during the time period from the first time to the second time; and
    in response to determining that the change in humidity in the first area of the property is greater than the change in humidity in the second area of the property during the time period from the first time to the second time, providing an indication of a water leak in the first area of the property to a user.

2. The monitoring system of claim 1, the operations comprising:
    determining that a predetermined time duration has elapsed since the first time; and
    obtaining the second humidity data at the second time in response to determining that the predetermined time duration has elapsed since the first time.

3. The monitoring system of claim 1, the operations comprising:
    determining, based on the occupancy data, that one or more people have returned to the property or are returning to the property; and
    obtaining the second humidity data at the second time in response to determining, that the one or more people have returned to the property or are returning to the property.

4. The monitoring system of claim 1, wherein determining that the change in humidity in the first area of the property is greater than the change in humidity in a second area of the property comprises:
    determining that a relative change between the humidity in the first area of the property and the humidity in the second area of the property is greater than a threshold relative change in humidity.

5. The monitoring system of claim 1, wherein the time period from the first time to the second time comprises a first time period, the operations comprising:
    determining a first relative change between humidity in the first area of the property and humidity in the second area of the property during the first time period;
    determining a second relative change between humidity in the first area of the property and humidity in the second area of the property during a second time period that is after the first time period;
    determining that the second relative change is greater than the first relative change; and
    in response to determining that the second relative change is greater than the first relative change, providing an indication to the user that the water leak in the first area of the property has worsened between the first time period and the second time period.

6. The monitoring system of claim 1, the operations comprising:
    obtaining first humidity data from a first humidity sensor located in the first area;
    obtaining second humidity data from a second humidity sensor located in the first area;
    determining, based on the first humidity data and the second humidity data, that humidity near the first humidity sensor is greater than humidity near the second humidity sensor; and
    based on determining that humidity near the first humidity sensor is greater than humidity near the second humidity sensor, determining a location of the water leak that is nearer to the first humidity sensor than to the second humidity sensor.

7. The monitoring system of claim 1, the operations comprising:
    obtaining air conditioning data indicating an operating status of an air conditioning system at the property;
    determining, using the air conditioning data, that the air conditioning system is not operating during the time period from the first time to the second time; and
    providing the indication of the water leak in the first area of the property to the user in response to (a) determining that the change in humidity in the first area of the property is greater than the change in humidity in the second area of the property during the time period from the first time to the second time and (b) determining that the air conditioning system is not operating during the time period from the first time to the second time.

8. The monitoring system of claim 1, the operations comprising:
    obtaining, from one or more sensors at the property, sensor data; and determining, using the first humidity data, the second humidity data, and the sensor data, a source of the water leak.

9. The monitoring system of claim 8, wherein the sensor data comprises one or more of camera data, audio data, or water flow data.

10. The monitoring system of claim 1, wherein the occupancy data comprises one or more of occupant schedule data, motion sensor data, audio data, camera data, geolocation data; and an arming state of the monitoring system.

11. The monitoring system of claim 1, wherein the multiple humidity sensors comprise a first humidity sensor located in the first area of the property and a second humidity sensor located in the second area of the property.

12. The monitoring system of claim 1, wherein determining that the change in humidity in the first area of the property is greater than the change in humidity in the second area of the property comprises:
determining that an increase in humidity in the first area of the property is greater than an increase in humidity in the second area of the property.

13. A method, comprising:
obtaining occupancy data that indicates whether people are within a property;
determining, using the occupancy data, that the property became unoccupied at a particular time;
in response to determining that the property became unoccupied at the particular time, obtaining, from multiple humidity sensors within the property, first humidity data at a first time, the first time being a predetermined time duration after the particular time when the property became unoccupied;
obtaining, from the multiple humidity sensors, second humidity data at a second time;
determining, using the first humidity data and the second humidity data, a change in humidity in a first area of the property and a change in humidity in a second area of the property during a time period from the first time to the second time;
determining that the change in humidity in the first area of the property is greater than the change in humidity in the second area of the property during the time period from the first time to the second time; and
in response to determining that the change in humidity in the first area of the property is greater than the change in humidity in the second area of the property during the time period from the first time to the second time, providing an indication of a water leak in the first area of the property to a user.

14. The method of claim 13, comprising:
determining that a predetermined time duration has elapsed since the first time; and
obtaining the second humidity data at the second time in response to determining that the predetermined time duration has elapsed since the first time.

15. The method of claim 13, comprising:
determining, based on the occupancy data, that one or more people have returned to the property or are returning to the property; and
obtaining the second humidity data at the second time in response to determining, that the one or more people have returned to the property or are returning to the property.

16. A monitoring system for monitoring a property, the monitoring system comprising one or more processors and one or more computer storage media storing instructions that are operable, when executed by the one or more processors, to cause the one or more processors to perform operations comprising:
obtaining occupancy data that indicates whether people are within the property;
determining, using the occupancy data, that the property became unoccupied at a particular time;
in response to determining that the property became unoccupied at the particular time, obtaining, from multiple humidity sensors within the property, first humidity data at a first time, the first time being a predetermined time duration after the particular time when the property became unoccupied;
obtaining, from the multiple humidity sensors, second humidity data at a second time;
obtaining outdoor humidity data indicating humidity outside of the property;
determining, using the first humidity data, the second humidity data, and the outdoor humidity data, that humidity in a first area of the property approached the humidity outside of the property during a time period from the first time to the second time; and
in response to determining that the humidity in the first area of the property approached the humidity outside of the property during the time period from the first time to the second time, providing an indication of an air leak in the first area of the property to a user.

17. The monitoring system of claim 16, wherein determining that the humidity in the first area approached the humidity outside of the property during the time period comprises:
determining that the humidity in the first area decreased during the time period to approach the humidity outside of the property.

18. The monitoring system of claim 16, the operations comprising:
obtaining air conditioning data indicating an operating status of an air conditioning system at the property;
determining, using the air conditioning data, that the air conditioning system is not operating during the time period from the first time to the second time; and
providing the indication of the air leak in the first area of the property to a user in response to (a) determining that the humidity in the first area of the property approached the humidity outside of the property during the time period from the first time to the second time and (b) determining that the air conditioning system is not operating during the time period from the first time to the second time.

19. The monitoring system of claim 1, wherein the predetermined time duration corresponds to an estimated time of dissipation of humidity effects caused by people or appliances within the property.

20. The method of claim 13, comprising determining the predetermined time duration using an estimated time of dissipation of humidity effects caused by people or appliances within the property.

* * * * *